US012771960B2

(12) United States Patent
Wu et al.

(10) Patent No.: US 12,771,960 B2
(45) Date of Patent: Oct. 20, 2026

(54) LEARNING-BASED LENS FLARE REMOVAL

(71) Applicant: Google LLC, Mountain View, CA (US)

(72) Inventors: Yicheng Wu, Houston, TX (US); Qiurui He, Mountain View, CA (US); Tianfan Xue, Sunnyvale, CA (US); Rahul Garg, Sunnyvale, CA (US); Jiawen Chen, San Ramon, CA (US); Jonathan T. Barron, Alameda, CA (US)

(73) Assignee: Google LLC, Mountain View, CA (US)

( * ) Notice: Subject to any disclaimer, the term of this patent is extended or adjusted under 35 U.S.C. 154(b) by 218 days.

(21) Appl. No.: 18/734,000

(22) Filed: Jun. 5, 2024

(65) Prior Publication Data

US 2024/0320808 A1 Sep. 26, 2024

Related U.S. Application Data

(63) Continuation of application No. 17/625,994, filed as application No. PCT/US2020/059661 on Nov. 9, 2020, now Pat. No. 12,033,309.

(Continued)

(51) Int. Cl.
*G06T 5/80* (2024.01)
*G06T 3/40* (2024.01)

(Continued)

(52) U.S. Cl.
CPC ............. *H04N 25/615* (2023.01); *G06T 3/40* (2013.01); *G06T 5/10* (2013.01); *G06T 5/20* (2013.01);

(Continued)

(58) Field of Classification Search
CPC ........... H04N 25/615; G06T 7/80; G06T 5/80; G06T 5/60; G06T 3/40; G06T 5/10;

(Continued)

(56) References Cited

U.S. PATENT DOCUMENTS 6,912,321 B2 * 6/2005 Gindele .................... G06T 5/90 348/688
8,456,545 B2 * 6/2013 Chan ...................... H04N 5/142 348/241

(Continued)

FOREIGN PATENT DOCUMENTS

CN 109740586 B 8/2022
JP 2019212132 A 12/2019

OTHER PUBLICATIONS

China National Intellectual Property Administration, The First Office Action mailed Sep. 3, 2024, issued in connection with Chinese Patent Application No. 202080061137.1, 11 pages (with English Translation).

(Continued)

*Primary Examiner* — Gregory M Desire
(74) *Attorney, Agent, or Firm* — McDonnell Boehnen Hulbert & Berghoff LLP

(57) ABSTRACT

A method includes obtaining an input image that contains a particular representation of lens flare, and processing the input image by a machine learning model to generate a de-flared image that includes the input image with at least part of the particular representation of lens flare removed. The machine learning (ML) model may be trained by generating training images that combine respective baseline images with corresponding lens flare images. For each respective training image, a modified image may be determined by processing the respective training image by the ML model, and a loss value may be determined based on a loss function comparing the modified image to a corresponding baseline image used to generate the respective training image. Parameters of the ML model may be adjusted based on the loss value determined for each respective training image and the loss function.

20 Claims, 9 Drawing Sheets

Related U.S. Application Data

(60) Provisional application No. 63/084,377, filed on Sep. 28, 2020.

(51) Int. Cl.
*G06T 5/10* (2006.01)
*G06T 5/20* (2006.01)
*G06T 5/60* (2024.01)
*G06T 7/80* (2017.01)
*H04N 25/615* (2023.01)

(52) U.S. Cl.
CPC .................. *G06T 5/60* (2024.01); *G06T 5/80* (2024.01); *G06T 7/80* (2017.01); *G06T 2207/20081* (2013.01); *G06T 2207/20084* (2013.01)

(58) Field of Classification Search
CPC ............. G06T 5/20; G06T 2207/20081; G06T 2207/20084
See application file for complete search history.

(56) References Cited

U.S. PATENT DOCUMENTS

| | | | | |
|---|---|---|---|---|
| 10,298,863 | B2 * | 5/2019 | Silverstein | H04N 25/61 |
| 10,382,712 | B1 * | 8/2019 | Forutanpour | H04N 23/80 |
| 10,620,921 | B2 | 4/2020 | Brebner | |
| 10,630,921 | B2 * | 4/2020 | Douady-Pleven | H04N 25/61 |
| 11,368,617 | B2 * | 6/2022 | Zhou | G06N 3/09 |
| 11,508,049 | B2 | 11/2022 | Seo et al. | |
| 2017/0070689 | A1 | 3/2017 | Silverstein et al. | |
| 2020/0143519 | A1 | 5/2020 | Gordon et al. | |
| 2020/0342652 | A1 | 10/2020 | Rowell et al. | |
| 2021/0201070 | A1 | 7/2021 | Omari et al. | |
| 2021/0201464 | A1 | 7/2021 | Tariq et al. | |

OTHER PUBLICATIONS

Xu, Tang, "Study on the influence of sunlight glare on drivers," Dissertation, Southeast University, 2020, 3 pages (Abstract Only).
Asha et al., "Auto Removal of Bright Spot from Images Captured Against Flashing Light Source," 2019 IEEE International Conference on Distributed Computing, VLSI, Electrical Circuits and Robotics (Discover), Aug. 11-12, 2019, 3 pages (Abstract).
Brooks et al., "Unprocessing Images for Learned Raw Denoising," arXiv: 1811.11127v1, CVPR, Nov. 27, 2018, 9 pages.
Chabert, Floris, "Automated Lens Flare Removal," Technical Report, Stanford University, 2015, 4 pages.
Chen et al., "Encoder-Decoder with Atrous Separable Convolution for Semantic Image Segmentation," arXiv:1802.02611v3, Aug. 22, 2018, 18 pages.
Criminisi et al., "Region Filling and Object Removal by Exemplar-Based Image Inpainting," IEEE Transactions on Image Processing, Sep. 2004, pp. 1-13, vol. 13, No. 9.
Fan et al., "A Generic Deep Architecture for Single Image Reflection Removal and Image Smoothing," ICCV, 2017, 10 pages.
Faulkner et al., "Veiling glare deconvolution of images produced by X-ray image intensifiers," Third International Conference on Image Processing and its Applications, Jul. 18-20, 2019, 2 pages (Abstract).
He et al., "Single Image Haze Removal Using Dark Channel Prior," IEEE Transactions on Pattern Analysis and Machine Intelligence, Dec. 2011, pp. 2341-2353, vol. 33, No. 12.
Hullin et al., "Physically-Based Real-Time Lens Flare Rendering," SIGGRAPH, 2011, 9 pages.
International Searching Authority, International Search Report and Written Opinion mailed Aug. 18, 2021, issued in connection with International Patent Application No. PCT/US2020/059661 filed on Nov. 9, 2020, 19 pages.
Kingma et al., "ADAM: A Method for Stochastic Optimization," arXiv: 1412.6980v9, Jan. 30, 2017, ICLR 2015, 15 pages.
Lee et al., "Practical Real-Time Lens-Flare Rendering," Eurographics Symposium on Rendering, 2013, 6 pages, vol. 32, No. 4.
Li et al., "Single Image Reflection Removal through Cascaded Refinement," Computer Vision and Pattern Recognition (CVPR), 2020, 10 pages.
Niklaus et al., "Context-aware Synthesis for Video Frame Interpolation," Computer Vision and Pattern Recognition (CVPR), 2018, 10 pages.
Qian et al., "Attentive Generative Adversarial Network for Raindrop Removal from A Single Image," Computer Vision and Pattern Recognition (CVPR), 2018, 10 pages.
Ranftl et al., "Towards Robust Monocular Depth Estimation: Mixing Datasets for Zero-shot Cross-dataset Transfer," IEEE Transactions on Pattern Analysis and Machine Intelligence, arXiv:1907.01341v3, Aug. 25, 2020, 14 pages.
Raskar et al., "Glare Aware Photography: 4D Ray Sampling for Reducing Glare Effects of Camera Lenses," ACM Trans. Graph., Aug. 2008, 10 pages, vol. 27, No. 3, Article 56.
Ronneberger et al., "U-Net: Convolutional Networks for Biomedical Image Segmentation," MICCAI, 2015, 8 pages.
Rouf et al., "Glare Encoding of High Dynamic Range Images," Computer Vision and Pattern Recognition (CVPR), 2011, pp. 289-296.
Simonyan et al., "Very Deep Convolutional Networks for Large-Scale Image Recognition," arXiv: 1409. 1556V6, ICLR, Apr. 2015, 14 pages.
Sun et al., "Learning Rank-1 Diffractive Optics for Single-shot High Dynamic Range Imaging," 202 IEEE/CVF Conference on Computer Vision and Pattern Recognition, Jun. 13, 2020, pp. 1383-1393.
Talvala et al., "Veiling Glare in High Dynamic Range Imaging," ACM Trans. Graph, Jul. 2007, 10 pages, vol. 26, No. 3, Article 37.
Vitoria et al., "Automatic Flare Spot Artifact Detection and Removal in Photographs," Journal of Mathematical Imaging and Vision, 2019, pp. 515-533, vol. 61.
Wei et al., "Semi-supervised Transfered Learning for Image Rain Removal," Computer Vision and Pattern Recognition (CVPR), 2019, 10 pages.
Wu et al., "How to Train Neural Networks for Flare Removal," arXiv:2011.12485v4, Oct. 8, 2021, 14 pages.
Yu et al., Multi-Scale Context Aggregation By Dilated Convolutions, arXiv: 1511.07122v3, ICLR 2016, 13 pages.
Zhang et al., "Single Image Reflection Separation with Perceptual Losses," Computer Vision and Pattern Recognition (CVPR), 2018, 9 pages.

* cited by examiner

LEARNING-BASED LENS FLARE REMOVAL

CROSS-REFERENCE TO RELATED APPLICATIONS

This application is a continuation of and claims priority to U.S. patent application Ser. No. 17/625,994, filed Jan. 10, 2022, and titled "Learning-Based Lens Flare Removal," which is a National Stage Application under 35 U.S.C. § 371 and claims priority to International Patent Application No. PCT/US2020/059661, filed Nov. 9, 2020, and titled "Learning-Based Lens Flare Removal," which claims priority to U.S. provisional patent application No. 63/084,377, filed on Sep. 28, 2020, each of which is hereby incorporated by reference as if fully set forth in this description.

BACKGROUND

Lens flare is a common artifact in photographs resulting from a camera being pointed at a strong light source. Lens flare can degrade the image quality of the photographs by obscuring or interfering with representations of portions of an environment.

SUMMARY

A machine learning model, such as a convolutional neural network, may be trained to determine representations of lens flare in images. Specifically, the machine learning model may be configured to process an input image that includes a representation of lens flare to generate a de-flared version of the input image with at least some of the representation of lens flare removed. The machine learning model may be trained based on a plurality of training images formed by combining a plurality of baseline images that lack representations of lens flare with a plurality of lens flare images that represent lens flare. Some of the lens flare images may be experimentally captured using a physical camera, while others may be generated based on a computer simulation of a camera.

In a first example embodiment, a method may include obtaining (i) a plurality of baseline images and (ii) a plurality of lens flare images. The method may also include generating a plurality of training images by combining each respective baseline image of the plurality of baseline images with a corresponding lens flare image of the plurality of lens flare images. The method may additionally include determining, for each respective training image of the plurality of training images, a modified image by processing the respective training image by a machine learning model. The modified image may include the respective training image with at least part of a corresponding representation of lens flare removed. The method may yet additionally include determining, for each respective training image of the plurality of training images, a loss value based on a loss function configured to compare the modified image to a corresponding baseline image used to generate the respective training image. The method may further include adjusting one or more parameters of the machine learning model based on (i) the loss value determined for each respective training image and (ii) the loss function.

In a second example embodiment, a system may include a processor and a non-transitory computer-readable medium having stored thereon instructions that, when executed by the processor, cause the processor to perform operations. The operations may include obtaining (i) a plurality of baseline images and (ii) a plurality of lens flare images. The operations may also include generating a plurality of training images by combining each respective baseline image of the plurality of baseline images with a corresponding lens flare image of the plurality of lens flare images. The operations may additionally include, for each respective training image of the plurality of training images, determining a modified image by processing the respective training image by a machine learning model. The modified image may include the respective training image with at least part of a corresponding representation of lens flare removed. The operations may yet additionally include determining, for each respective training image of the plurality of training images, a loss value based on a loss function configured to compare the modified image to a corresponding baseline image used to generate the respective training image. The operations may further include adjusting one or more parameters of the machine learning model based on (i) the loss value determined for each respective training image and (ii) the loss function.

In a third example embodiment, an article of manufacture may include a non-transitory computer-readable medium having stored thereon instructions that, when executed by a computing device, cause the computing device to perform operations. The operations may include obtaining (i) a plurality of baseline images and (ii) a plurality of lens flare images. The operations may also include generating a plurality of training images by combining each respective baseline image of the plurality of baseline images with a corresponding lens flare image of the plurality of lens flare images. The operations may additionally include, for each respective training image of the plurality of training images, determining a modified image by processing the respective training image by a machine learning model. The modified image may include the respective training image with at least part of a corresponding representation of lens flare removed. The operations may yet additionally include determining, for each respective training image of the plurality of training images, a loss value based on a loss function configured to compare the modified image to a corresponding baseline image used to generate the respective training image. The operations may further include adjusting one or more parameters of the machine learning model based on (i) the loss value determined for each respective training image and (ii) the loss function.

In a fourth example embodiment, a system may include means for obtaining (i) a plurality of baseline images and (ii) a plurality of lens flare images. The system may also include means for generating a plurality of training images by combining each respective baseline image of the plurality of baseline images with a corresponding lens flare image of the plurality of lens flare images. The system may additionally include means for determining, for each respective training image of the plurality of training images, a modified image by processing the respective training image by a machine learning model. The modified image may include the respective training image with at least part of a corresponding representation of lens flare removed. The system may yet additionally include means for determining, for each respective training image of the plurality of training images, a loss value based on a loss function configured to compare the modified image to a corresponding baseline image used to generate the respective training image. The operations may further include adjusting one or more parameters of the machine learning model based on (i) the loss value determined for each respective training image and (ii) the loss function.

In a fifth example embodiment, a method may include obtaining an input image that contains a particular representation of lens flare. The method may also include processing the input image by a machine learning model to generate a de-flared image that includes the input image with at least part of the particular representation of lens flare removed. The machine learning model may have been trained to determine representations of lens flare in images. The method may additionally include outputting the de-flared image.

In a sixth example embodiment, a system may include a processor and a non-transitory computer-readable medium having stored thereon instructions that, when executed by the processor, cause the processor to perform operations. The operations may include obtaining an input image that contains a particular representation of lens flare. The operations may also include processing the input image by a machine learning model to generate a de-flared image that includes the input image with at least part of the particular representation of lens flare removed. The machine learning model may have been trained to determine representations of lens flare in images. The operations may additionally include outputting the de-flared image.

In a seventh example embodiment, an article of manufacture may include a non-transitory computer-readable medium having stored thereon instructions that, when executed by a computing device, cause the computing device to perform operations. The operations may include obtaining an input image that contains a particular representation of lens flare. The operations may also include processing the input image by a machine learning model to generate a de-flared image that includes the input image with at least part of the particular representation of lens flare removed. The machine learning model may have been trained to determine representations of lens flare in images. The operations may additionally include outputting the de-flared image.

In an eighth example embodiment, a system may include means for obtaining an input image that contains a particular representation of lens flare. The system may also include means for processing the input image by a machine learning model to generate a de-flared image that includes the input image with at least part of the particular representation of lens flare removed. The machine learning model may have been trained to determine representations of lens flare in images. The system may additionally include means for outputting the de-flared image.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
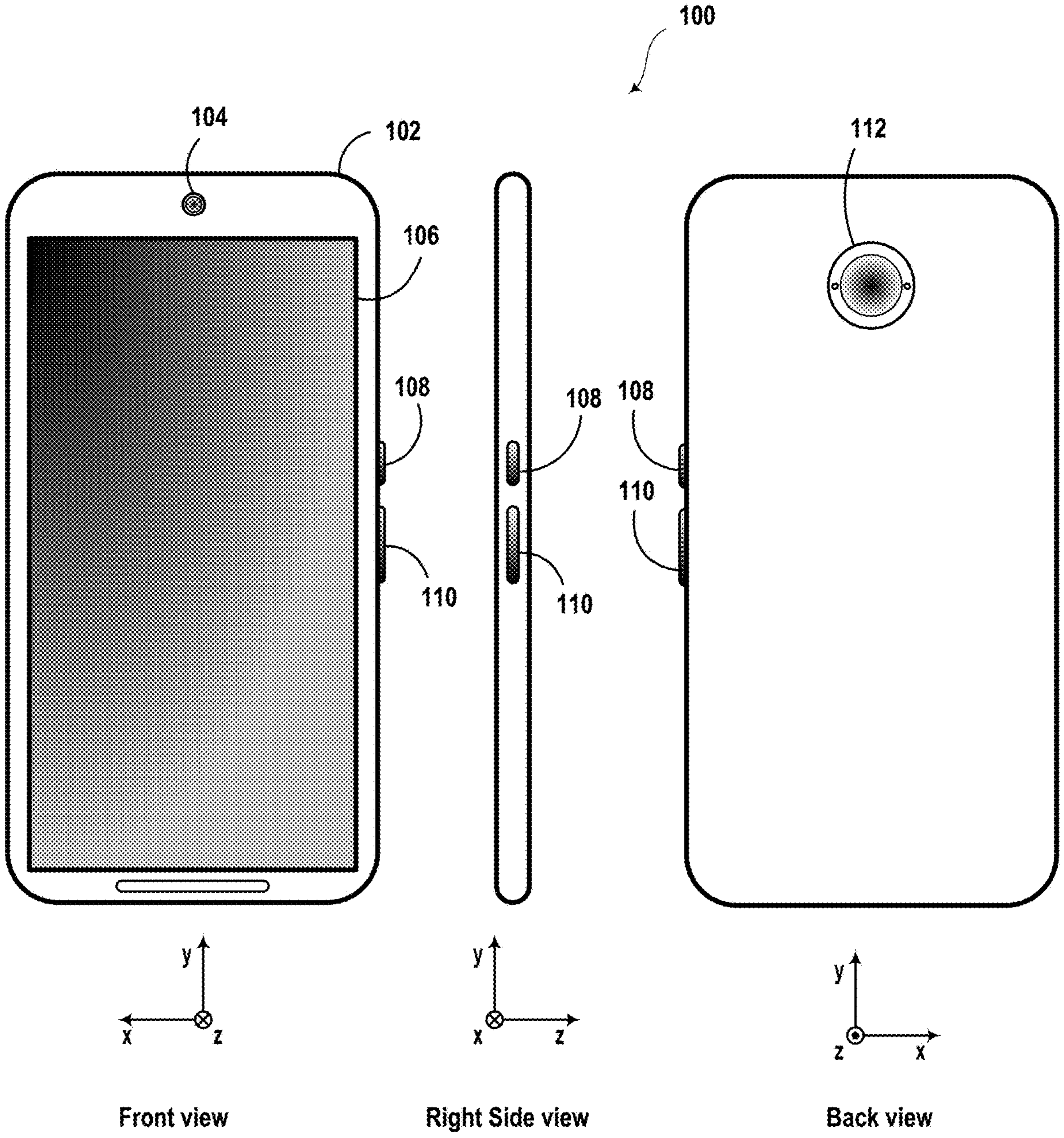
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Lens flare is an optical phenomenon observed when a camera captures light emitted by a relatively strong/bright light source. Lens flare may cause and/or be represented as visual artifacts/patterns within the image data that resemble streaks, lines, and/or irregular blobs, among other possible visual artifacts/patterns. Representations of lens flare in image data may be caused by internal reflections of light by optical components (e.g., lenses) of the camera, and the specific visual pattern of the representation may vary depending on the optical properties of the optical components. Representations of lens flare in image data may also be caused by scattering and/or diffraction of light by imperfections present in and/or on the optical components of the camera, and the specific visual pattern of the representation may vary depending on the specific types, sizes, and/or spatial distribution of the imperfections.

In general, light from many parts of a scene may undergo such internal reflection, scattering, and/or diffraction. When the intensity of incident light is relatively low, the internally reflected, scattered, and/or diffracted light might not cause a perceptible representation of lens flare. However, when the intensity of the incident light is relatively high, such as when a strong/bright light source is present within the scene, the internally reflected, scattered, and/or diffracted light may cause perceptible representations of lens flare. In some cases, it may be desirable to remove the representation of lens flare from an image to represent the corresponding scene as it would appear without lens flare. In other cases, it may be desirable to adjust the representation of lens flare by, for example, intensifying the representation, de-intensifying the representation, and/or adjusting a color of the representation, among other possibilities.

Lens flare may occur due to a variety of complex optical phenomena that are difficult to predict and/or control for any particular imaging scenario. Therefore, representations of lens flare are typically removed by manual processing of images in which a user identifies lens flare in an image by visual inspection and modifies the image to remove or reduce the lens flare. Such manual processing of images is, however, time consuming and requires skilled manipulation of images. The challenges associated with controlling lens flare in imaging scenarios mean that there is a need for automated image processing to remove representations of lens flare in images. Due to the challenges associated with controlling lens flare in imaging scenarios, existing lens flare techniques generally try to characterize shape properties of representations of lens flare and use such properties to identify the representations of lens flare. The variety of optical phenomena that may cause lens flare mean that techniques using characteristic properties of representations of lens flare generally perform poorly.

Accordingly, a machine learning model, such as a convolutional neural network (CNN), may be trained to determine representations of lens flare in images. Specifically, determining a particular representation of lens flare in an input image by the machine learning model may involve (i) generating a recovered lens flare image that represents lens flare and/or (ii) generating a de-flared image that includes an input image with at least part of the particular representation of lens flare removed.

Capturing training image pairs that each include (i) corresponding representations of a scene and lens flare occurring due to a light source that forms part of the scene and (ii) the corresponding representation of the scene without the corresponding representation of lens flare may be difficult, time-consuming, and/or infeasible. Specifically, capturing such training image pairs may be difficult, time-consuming, and/or infeasible since the aspects of the camera device that give rise to lens flare might not be easily controllable, if controllable at all.

Accordingly, training data for the machine learning model may be generated by combining (i) flare-free baseline images with (ii) flare-only lens flare images. The flare-free baseline images may be captured/generated independently of the flare-only images. Thus, each training image in the training data may be explicitly separated into (i) a representation of a corresponding flare-free scene and (ii) a corresponding representation of lens flare, providing supervision for the machine learning model. The lens flare images may be generated using computer simulation of a camera device and light source, and/or experimental/physical capture of images of a physical light source with a physical camera device.

In particular, the simulated lens flare images generated by the computer simulation may represent at least lens flare caused by scattering and/or diffraction of light by various optical imperfections. The optical imperfections may be difficult to control and/or vary on a physical camera, but may be relatively easier to simulate, thus allowing for deterministic generation of a wide range of visual patterns (e.g., first lens flare patterns) caused by the scattering and/or diffraction. The physically-captured images may represent at least lens flare caused by internal reflections of light by the optical components (as well as the scattering and/or diffraction of light by specific optical imperfections associated with the corresponding physical camera device). The internal reflections may be difficult to simulate in that simulation may be based on an accurate model (which might not be publicly available) of the optical components, but may be relatively easier to physically capture, thus allowing for deterministic generation of a wide range of visual patterns (e.g., second lens flare patterns) caused by the internal reflections.

Collectively, the simulated lens flare images and the experimental lens flare images may provide a representative sample of the various possible representations of lens flare that could be present in images. Further, while lens flare is induced by the presence of a strong light source in a scene, the visual pattern of the representation of lens flare is generally independent of scene composition in that the presence and/or arrangement of objects (other than the light source) within the scene is unlikely to cause and/or influence lens flare. Accordingly, synthetic training data generated by combining disparate, independently-generated baseline and lens flare images is not detrimental to the machine learning model's ability to extrapolate to real/non-synthetic scenes at inference time, since removal of lens flare is unlikely to depend on scene composition. In fact, synthetic training data generated in this manner may be desirable due to the resulting variety/diversity of scene and flare combinations, which may improve the trained model's ability to extrapolate to new real/non-synthetic scenes.

The trained machine learning model may process an input image that includes a representation of lens flare to generate a de-flared image. The de-flared image may correspond to the input image with at least a portion of the representation of lens flare removed. In one example, the machine learning model may be configured to generate the de-flared image directly (i.e., the de-flared image may be the output of the machine learning model). In another example, the machine learning model may be configured to generate a recovered lens flare image, which may be subtracted from the input image to thereby generate the de-flared image. In either case, the machine learning model may be configured to determine/identify the representation of lens flare within the input image.

Additionally or alternatively, the recovered lens flare image may be generated by subtracting the de-flared image from the input time. The recovered lens flare image may thus represent the portion of the representation of lens flare that was determined/identified by the machine learning model in the input image. In some cases, the intensity and/or color of aspects of the recovered lens flare may be modified and added back to the de-flared image, thus generating a version of the input image where the visual appearance of the representation of lens flare has been altered in a particular manner.

The machine learning model may be configured to operate on monoscopic image data captured using monoscopic cameras. Thus, the machine learning model might not depend on the input image being captured using any particular type of hardware (e.g., stereoscopic camera) and/or including any annotations (e.g., disparity map) additional to the image data itself.

In some cases, the machine learning model may have been trained to determine the representation of lens flare by determining a representation of the light source causing the lens flare. Thus, the representation of the light source may be determined/identified along with the representation of lens flare, and may thus be removed from the input image when generating the de-flared image. Accordingly, a light source mask may be generated and used to copy a representation of the light source from the input image into the de-flared image, resulting in a modified version of the input image with (i) the representation of lens flare removed therefrom and (ii) the representation of the light source present therein. In some cases, the representation of the light source may be copied into a version of the input image that has had its corresponding representation of lens flare modified, as described above.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras. In one example, rear-facing camera 112 may constitute and/or form part of a stereoscopic camera.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
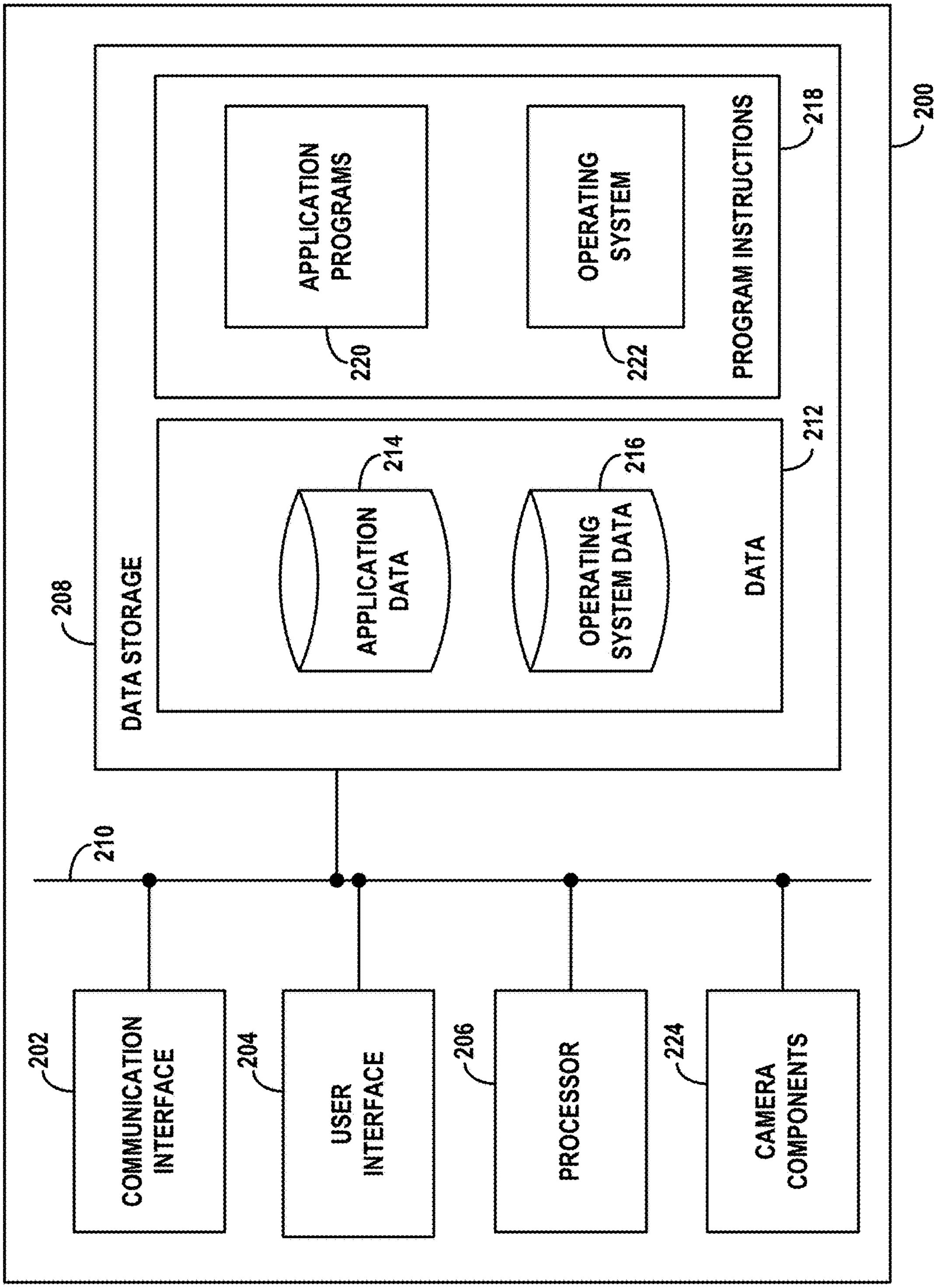
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. EXAMPLE SYSTEM FOR REMOVAL OF REPRESENTATIONS OF LENS FLARE FROM IMAGES

Figure 3A:
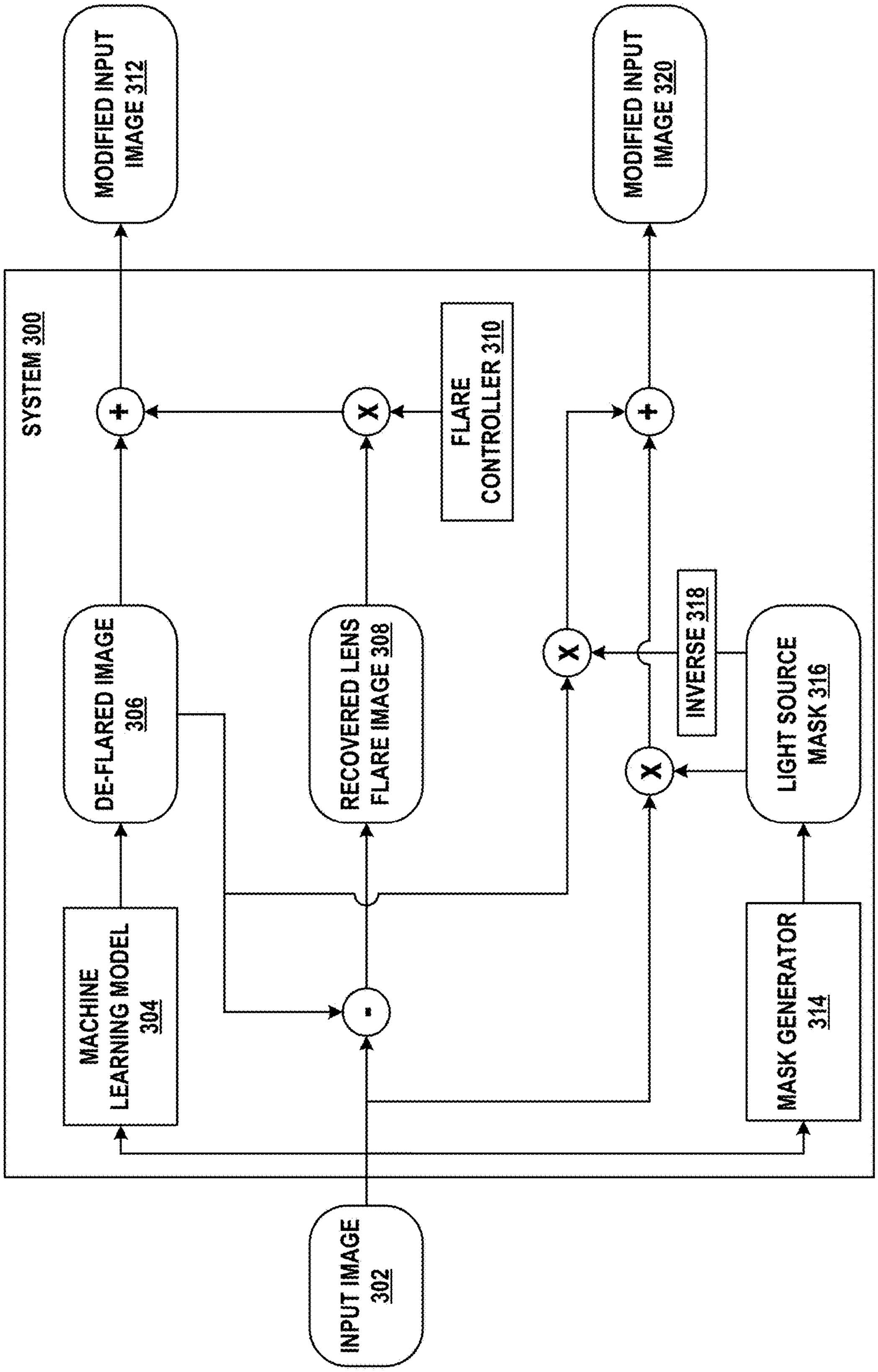
FIG. 3A illustrates a system, in accordance with examples described herein.

FIG. 3A illustrates an example system for removing representations of lens flare from images. Specifically, FIG. 3A illustrates system 300 which includes machine learning model 304, flare controller 310, mask generator 314, and inverse operator 318. System 300 may form part of computing device 100 and/or computing system 200, among other possibilities. System 300 may represent hardware components (e.g., purpose-built circuitry), software instructions, or a combination thereof.

System 300 may be configured to receive input image 302 and, based thereon, generate modified input image 312, modified input image 320, and/or a combination of modified input images 312 and 320, each of which may be a respective modified version of input image 302. Specifically, input image 302 may include therein a representation of lens flare. Machine learning model 304 may be configured to determine and/or identify within input image 302 at least part of the representation of lens flare.

In one example, determination of the representation of lens flare in input image 302 by machine learning model 304 may involve generating a new image that (i) lacks at least part of the representation of lens flare and (ii) preserves representations of the underlying scene of input image 302. Thus, machine learning model 304 may be configured to generate de-flared image 306, which corresponds to input image 302 with at least part of the representation of lens flare removed therefrom. Machine learning model 304 may include, for example, a convolutional artificial neural network, which may be arranged according to a U-Net architecture or a VGG-19 architecture, among other possibilities.

System 300 may also be configured to subtract de-flared image 306 from input image 302, thereby generating recovered lens flare image 308. Recovered lens flare image 308 may contain the representation of lens flare that machine learning model 304 has determined in input image 302, and has removed from input image 302 when generating de-flared image 306. Thus, a sum of de-flared image 306 and recovered lens flare image 308 may be equal to input image 302.

In a second example, determination of the representation of lens flare in input image 302 by machine learning model 304 may instead involve generating a new image that (i) represents the at least part of the representation of lens flare and (ii) lacks representations of the underlying scene of input image 302. That is, machine learning model 304 may instead be configured to generate recovered lens flare image 308, which represents at least part of the representation of lens flare determined/identified in input image 302. Accordingly, system 300 may instead be configured to subtract recovered lens flare image 308 from input image 302, thereby generating de-flared image 306.

Flare controller 310 may be configured to generate one or more flare modification values by which a plurality of pixels of recovered lens flare image 308 may be multiplied to modify a visual appearance of the representation of lens flare. Specifically, some pixels of input image 302 that do not represent lens flare might not be modified when determining de-flared image 306, and thus corresponding pixels of recovered lens flare image 308 may have a value of zero. Accordingly, each non-zero pixel in recovered lens flare image 308 may be modified according to one or more of the flare modification values generated by flare controller 310.

Specifically, an intensity and/or color of the representation of lens flare in recovered lens flare image 308 may be modified by multiplying each color component (e.g., red, green, blue) of the pixels of recovered lens flare image 308 by a corresponding value. For example, an intensity of the representation of lens flare may be increased by multiplying each color component by a value greater than one. In another example, a color of the representation of lens flare may be modified by multiplying each color component by a different value so as to achieve a desired color (e.g., multiplying green and blue pixel components by 1 and red pixel components by 2 so as to make the representation of lens flare appear more red). The representation of lens flare may be removed entirely by multiplying each of the non-zero values in recovered lens flare image 308 by zero, resulting in modified input image 312 being equal to de-flared image 306.

System 300 may be configured to, after multiplying the pixels of recovered lens flare image 308 by the one or more flare modification values, add recovered lens flare image 308 as multiplied to de-flared image 306, thereby generating modified input image 312. Modified input image 312 may represent input image 302 with the representation of lens flare modified according to the one or more flare modification values. For example, modified input image 312 may be equivalent to input image 302 with the representation of lens flare increased, decreased, and/or with the color of the representation modified, among other possibilities. Thus, by generating recovered lens flare image 308, modifying it using flare controller 310, and adding the modified version back to de-flared image 306, system 300 may allow for various visual modifications to the representation of lens flare in input image 302.

In some implementations, machine learning model 304 may be configured to also determine and/or identify, within input image 302, a representation of one or more light sources that cause lens flare (e.g., machine learning model 304 may treat the one or more light sources the same as lens flare). Thus, in such implementations, de-flare image 306 might not represent the one or more light sources that cause lens flare. In some cases, however, it may be desirable to remove the representation of lens flare from input image 302 while keeping the representation of the corresponding one or more light sources causing this lens flare. Accordingly, system 300 may include mask generator 314 configured to generate light source mask 316, which may be used to add back into de-flared image 306 representations of the one or more light sources causing lens flare.

Specifically, light source mask 316 may include, for example, a grayscale image that includes a plurality of pixels and has a same resolution as input image 302 and/or de-flared image 306. A pixel with a first value (e.g., 255) may indicate that a corresponding pixel in input image 302 represents a light source, while a pixel with a second value (e.g., 0) may indicate that a corresponding pixel in input image 302 does not represent a light source. Values in between the first value and the second value may be used to create a smooth and/or gradual transition between regions representing a light source and regions that do not represent a light source.

Mask generator 314 may be configured to determine that a particular pixel in input image 302 represents a light source based on, for example, a luminance value associated with the particular pixel exceeding a threshold luminance value (e.g., 0.95). Thus, mask generator 314 may be configured to generate light source mask 316 by assigning, to each pixel of light source mask 316, a corresponding value (e.g., 255 or 0) based on whether a luminance value of a spatially-corresponding pixel in input image 302 exceeds the threshold luminance value.

System 300 may be configured to multiply light source mask 316 and input image 302, thereby generating a first masked image that includes the light sources represented in input image 302, but excludes other features represented therein. Further, system 300 may be configured to multiply de-flared image 306 by an inverse of light source mask 316, thereby generating a second masked image that excludes regions of de-flared image 306 corresponding to light sources, but includes all other features of de-flared image 306. System 300 may be further configured to add the first masked image and the second masked image, thereby generating modified input image 320. Thus, system 300 may implement the function $I_B=I_F\odot M+I_{DE\text{-}FLARED}\odot(1-M)$, where $I_B$ represents modified input image 320, $I_F$ represents input image 302, M represents light source mask 316, $I_{DE\text{-}FLARED}$ represents de-flared image 306, and $\odot$ represents pixel-wise multiplication. Modified input image 320 may thus represent input image 302 with the representation of lens flare removed therefrom and including the representation of one or more light sources causing the lens flare.

Alternatively, in some cases, instead of applying light source mask 316 (modified by inverse 318) to de-flared image 306, system 300 may instead be configured to apply light source mask 316 (modified by inverse 318) to modified input image 312. Thus, the representation of lens flare contained in input image 302 may be modified according to flare controller 310, while the light source causing the representation of lens flare may remain unmodified. Accordingly, modified input image 320 may represent input image 302 with the representation of lens flare modified and including the representation of one or more light sources causing the lens flare. The same effect may alternatively be achieved by applying light source mask 316 (modified by inverse 318) to an output of flare controller 310, resulting in representations of the light source in recovered lens flare image 308 being added back into de-flared image 306 without modification.

Figure 3B:
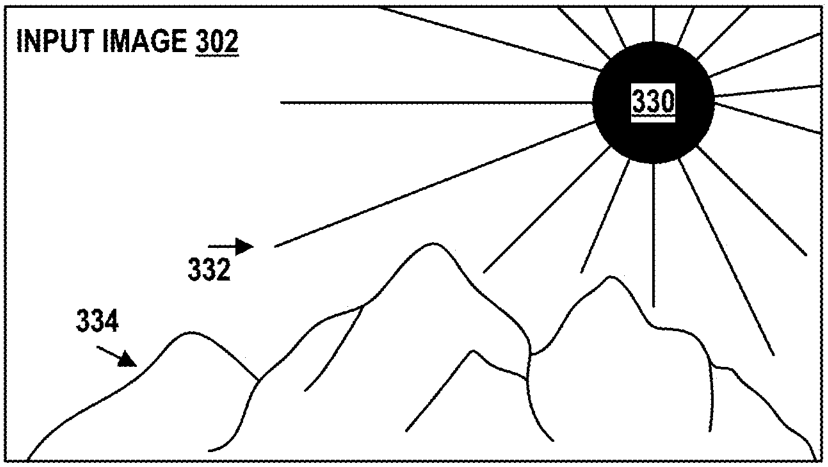
FIGS. 3B and 3C illustrate images, in accordance with examples described herein.
Figure 3B:
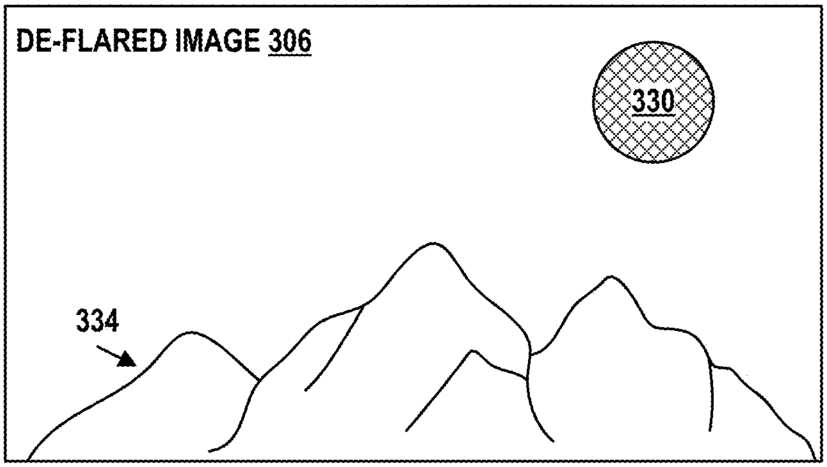
Figure 3B:
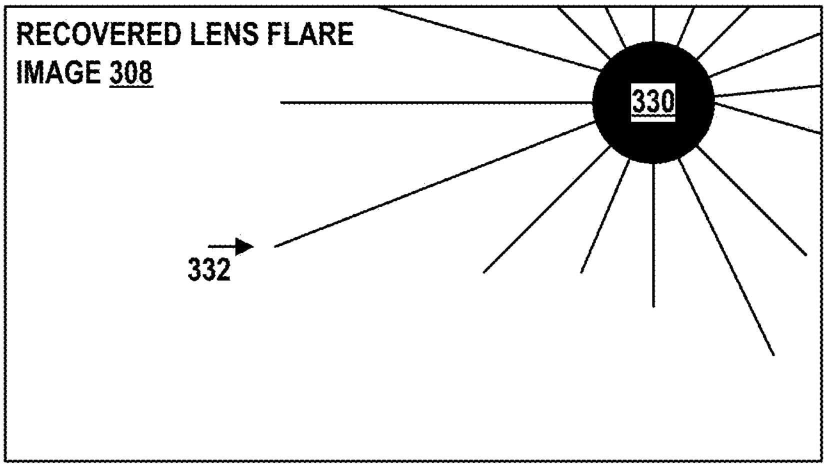
Figure 3C:
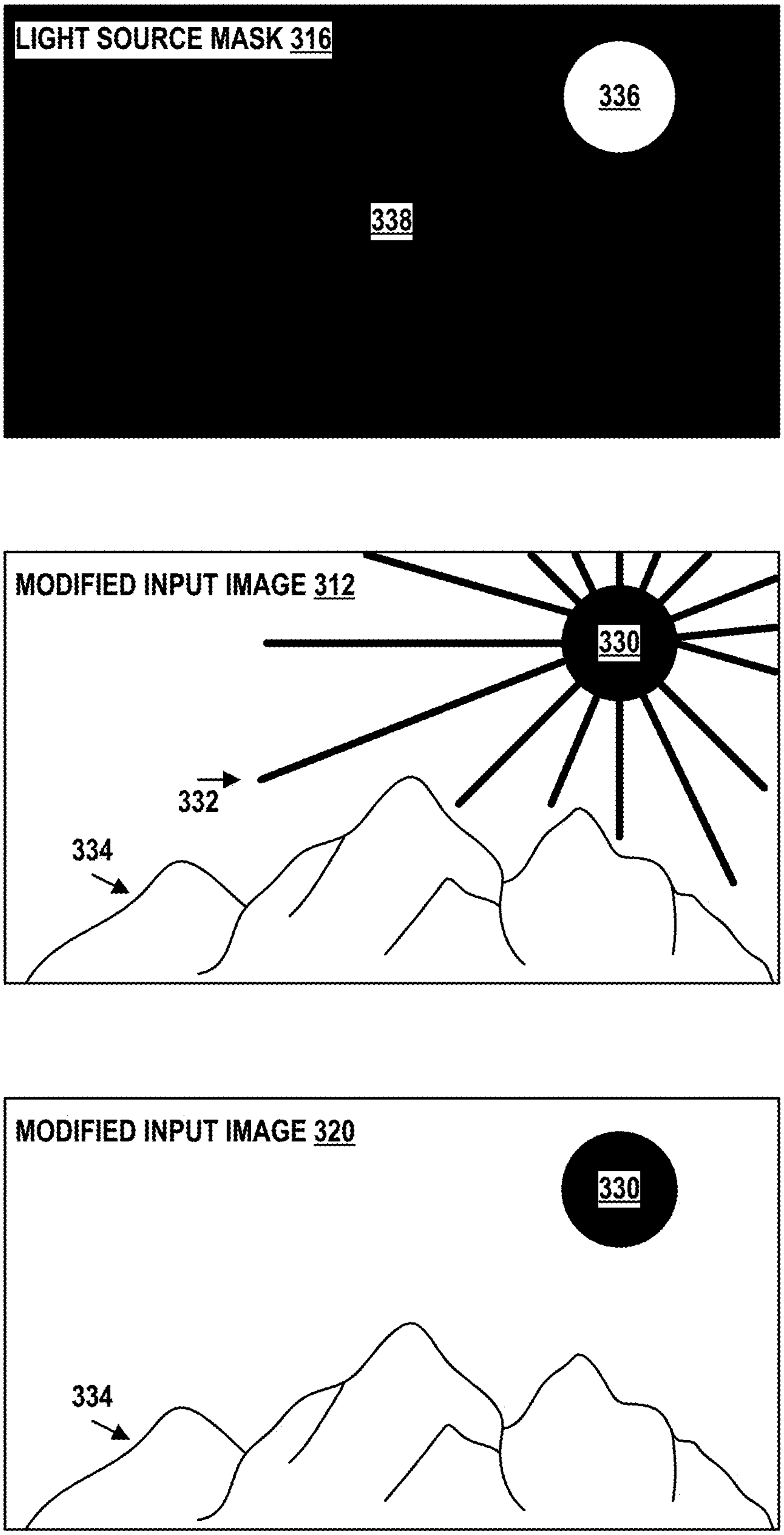

FIGS. 3B and 3C include example visual illustrations of input image 302, de-flared image 306, recovered lens flare image 308, light source mask 316, modified input image 312, and modified input image 320. Specifically, input image 302 may include representation 330 of a light source (e.g., the sun), representation 332 of lens flare (indicated by lines projecting out of the light source) caused by the light source, and representation 334 of mountains, which form part of the underlying scene represented by input image 302. De-flared image 306 includes representation 334 of the mountains, but lacks representation 332 of lens flare. In some cases, de-flared image 306 may also lack representation 330 of the light source, as indicated by the hatched pattern thereon. Recovered lens flare image 308 includes representation 332 of lens flare and, in some cases, representation 330 of the light source.

Light source mask 316 includes mask region 336 corresponding to representation 330 of the light source, and mask region 338 corresponding to a remainder of input image 302 (i.e., regions that do not represent a light source causing lens flare). Mask region 336 is shown in white, indicating that pixels thereof are assigned a first value (e.g., 255 in a grayscale image, or 1 in a binary image), and thus "pass" all corresponding pixels of input image 302, while mask region 338 is shown in black, indicating that pixels thereof are assigned a second value (e.g., 0 in a grayscale image and/or binary image), and thus "block" all corresponding pixels of input image 302. Intermediate pixel values are not shown as part of light source mask 316, but may be used to create a gradual transition between mask region 336 and mask region 338. An inverse of light source mask 316 (not shown) includes each pixel of mask region 336 assigned the second value (e.g., 0, corresponding to black), and thus configured to "block" all corresponding pixels of de-flared image 306, and each pixel of mask region 338 assigned the first value (e.g., 255 or 1, corresponding to white), and thus configured to "pass" all corresponding pixels of de-flared image 306.

Modified input image 312 includes representations 330, 332, and 334, with representation 332 (and, in some cases, representation 330) having been modified to intensify the visual appearance of lens flare, as indicated by the corresponding lines being bolder than shown in input image 302. In other cases, representation 332 may alternatively and/or additionally be modified by changing a color thereof and/or by decreasing the intensity thereof (e.g., reducing a luminance of the corresponding pixels), among other possibilities. Modified input image 320 includes representation 330 and representation 334, and excludes representation 332. Thus, modified input image 320 represents the corresponding scene as it would appear without lens flare.

IV. EXAMPLE TRAINING OPERATIONS

Figure 4:
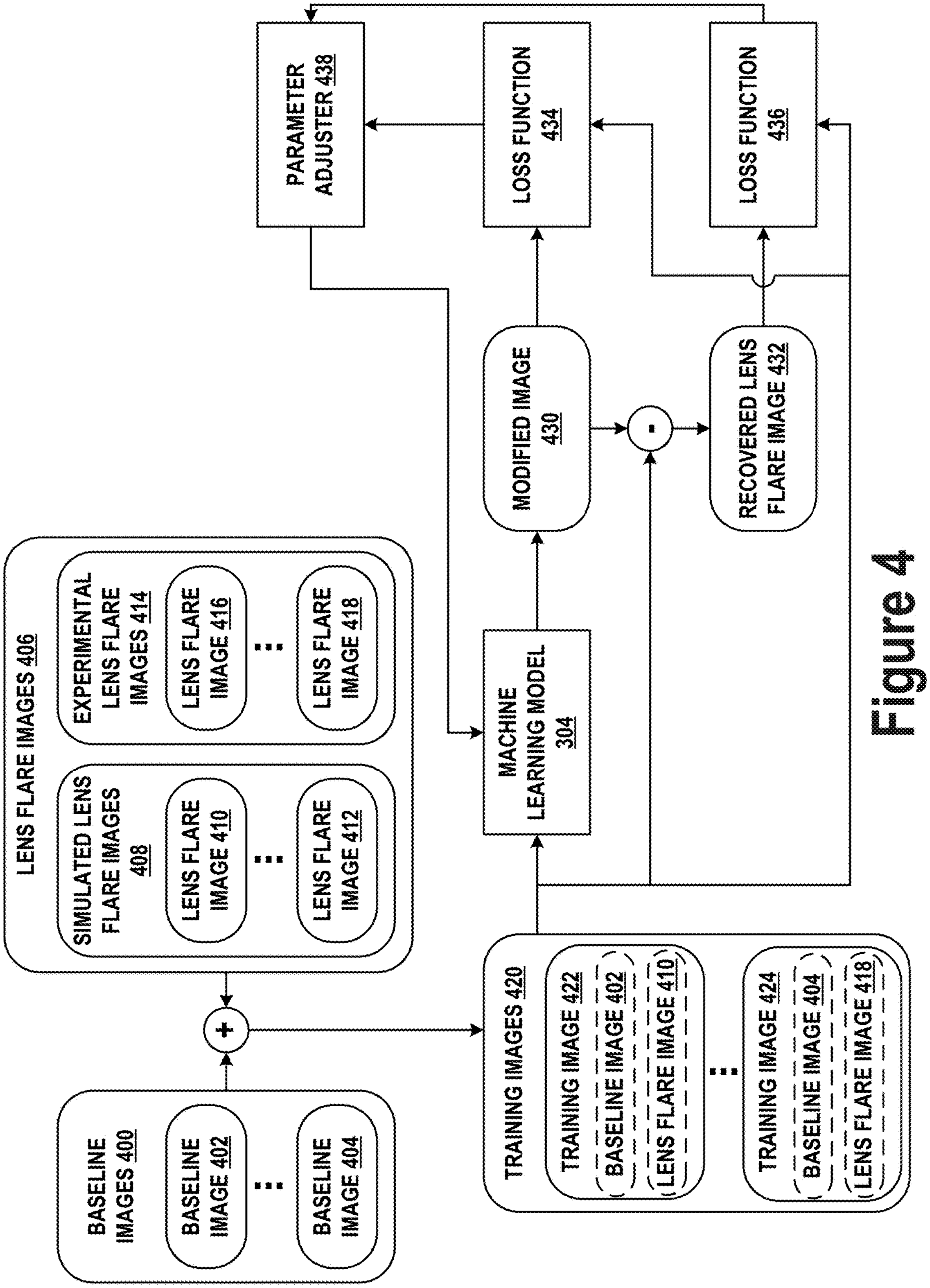
FIG. 4 illustrates a system for training a machine learning model, in accordance with examples described herein.

FIG. 4 illustrates an example system and process for training of machine learning model 304 to determine/identify representations of lens flare from images. Specifically, machine learning model 304 may be trained based on training images 420, which may be generated based on baseline images 400 and lens flare images 406. Baseline images 400 may include baseline image 402 through baseline image 404 (i.e., baseline images 402-404). Baseline images 400 may represent a plurality of different scenes/environments. In some cases, baseline images 400 or a subset thereof may include images that are free of representations of lens flare, and may thus be considered to represent "clean" scenes/environments. Thus, due to lacking representations of lens flare, baseline images 400 may alternatively be referred to as natural images, clean images, flare-free images, and/or flare-free natural images. Each baseline image of baseline images 400 may be represented using the variable $I_0$.

Lens flare images 406 may include simulated lens flare images 408 and/or experimental lens flare images 414. Simulated lens flare images 408 may include lens flare image 410 through lens flare image 412 (i.e., lens flare images 410-412), and experimental lens flare images may include lens flare image 416 through lens flare image 418 (i.e., lens flare images 416-418). Lens flare images 406 may include a plurality of different representations of lens flare. In some cases, lens flare images 406 may represent a plurality of different variations of lens flare against a monotone (e.g., black) background, rather than against a non-uniform background (e.g., a representation of an environment), so that portions of lens flare images 406 representing lens flare may be easily separated/distinguished from portions that do not represent lens flare. Thus, lens flare image 406 may alternatively be referred to as flare-only images due to only including representations of lens flare. Each lens flare image of lens flare images 406 may be represented using the variable F.

Simulated lens flare images 408 may be generated based on a computer simulation of at least (i) a light source and (ii) one or more camera devices, including one or more respective optical components thereof. Simulated lens flare images 408 may represent lens flare caused by scattering and/or diffraction of light by imperfections (e.g., dust, scratches, etc.) present on the respective optical components of the camera device. Since such imperfections are random, it may be challenging, time-consuming, difficult, and/or infeasible to experimentally collect a plurality of images representing lens flare caused by a range of imperfections that is representative of imperfections that could be encountered in practice. Simulation, however, allows the range of imperfections to be controlled, thus allowing for generation of images that cover and/or are representative of a variety of possible imperfections that could be encountered in practice. In some cases, simulated lens flare images 408 may additionally or alternatively represent lens flare caused by internal reflections of light from optical components (e.g., lenses) of the camera device.

In one example, the computer simulation may involve generating a point spread function $PSF_{\lambda_0}$ of the camera device based on a Fourier transform of a pupil function of the camera device. Specifically, the pupil function may be based on (i) an aperture function A, (ii) a linear phase shift term $\phi^S(x/z, y/z)$, and (iii) a defocus term $\phi^{DF}(z)$. The point spread function may be expressed as a product of (i) the aperture function and (ii) an exponential of a sum of the linear phase shift term and the defocus term, namely $PSF_{\lambda_0}=|F\{A\exp[\phi^S(x/z, y/z)+\phi^{DF}(z)]\}|^2$.

The aperture function A may alternatively be referred to as an amplitude, and may represent one or more simulated imperfection (e.g., presence of dust or scratches) of an aperture and/or one or more lenses of the camera device. Thus, a plurality of different aperture functions may be used to represent a plurality of different imperfections. For example, to simulate the plurality of different imperfections, a plurality of different lines and dots of varying sizes and/or varying transparencies may be generated (e.g., randomly) on a disk that represents the aperture and/or one or more lenses of the camera device.

The linear phase shift term $\phi^{S}(x/z, y/z)$ may represent a phase shift caused by the one or more lenses of the camera device. The linear phase shift term $\phi^{S}(x/z, y/z)$ may be determined based on an angle from which light is incident on the one or more lenses of the camera device, and may thus be based on a simulated relative position between the camera device and the light source. The defocus term $\phi^{DF}(z)$ may represent an extent to which the simulated light source is out of focus based on its depth relative to the one or more lenses of the camera device. Thus, the defocus term $\phi^{DF}(z)$ may also be determined based on the simulated relative position between the camera device and the light source.

The point spread function $PSF_{\lambda_0}$ may be specific to a single wavelength $\lambda_0$. Thus, in order to simulate a light source that includes a plurality of wavelengths (e.g., corresponding to the visible portion of the electromagnetic spectrum), the point spread function $PSF_{\lambda_0}$ may be sampled at a plurality of different wavelengths. For example, the point spread function $PSF_{\lambda_0}$ may be sampled from 380 nanometers to 740 nanometers in increments of 5 nanometers, thereby generating a multi-channel (e.g., 73-channel) point spread function $PSF_{\lambda_0}$ representing a light source that emits a plurality of different wavelengths. In some implementations, the point spread function $PSF_{\lambda_0}$ may be sampled along a different range of wavelengths and/or in different increments.

The multi-channel point spread function $PSF_{\lambda}$ may be used to generate a simulated sensor measurement, resulting in a corresponding one of simulated lens flare images 408. Specifically, the simulated sensor measurement may be generated by multiplying the multi-channel point spread function $PSF_{\lambda}$ by a color matrix C corresponding to an image sensor of the simulated camera device. The color matrix C may represent, for example, a transformation from the point spread function space to image space represented as, for example, red-green-blue (RGB) pixel values. Thus, a simulated lens flare image may be determined according to the function $PSF_{RGB}=C(PSF_{\lambda})$. A plurality of different color matrices may be used to simulate different types of image sensors.

Simulated lens flare images 408 may include a plurality of different representations of lens flare. These different representations may be generated by varying the aperture function A, the relative position between the light source and the camera device (thus varying the linear phase shift term $\phi^{S}(x/z, y/z)$ and the defocus term $\phi^{DF}(z)$), the multi-channel point spread function $PSF_{\lambda}$, and/or the color matrix C. In some cases, generation of lens flare images 408 may also include application of one or more optical distortions (e.g., barrel distortion, pincushion distortion, etc.) to make the representations of lens flare appear more realistic.

Experimental lens flare images 414 may be generated by using one or more physical camera devices to capture images of a physical light source. Experimental lens flare images 414 may represent lens flare caused by internal reflections of light from optical components (e.g., lenses) of the camera device. It may be challenging, time-consuming, difficult, and/or infeasible to simulate a plurality of images representing lens flare caused by internal reflections since such a simulation may depend on an accurate optical model of the optical components (e.g., lens), which might not be publicly available.

However, representations of lens flare caused by internal reflection may be generally similar across similar camera devices and/or similar optical components (e.g., lenses). For example, representation of lens flare may be similar across different instances of a particular camera model. Thus, images that have been physically captured using various (e.g., commonly-used) camera devices and/or optical components may cover and/or be representative of a variety of possible representations of lens flare associated with the same or similar camera devices and/or optical components. In some cases, experimental lens flare images 414 may additionally or alternatively represent lens flare caused by scattering and/or diffraction of light by imperfections (e.g., dust, scratches, etc.) present on the respective optical components of the camera device.

Specifically, experimental lens flare images 414 may include representations of a light source captured by one or more camera devices from a plurality of different relative positions (e.g., linear and/or angular positions) between the one or more cameras and the light source. The light source and the one or more camera devices may be disposed in an optically-isolated environment, such that the one or more camera devices capture substantially only light emitted by the light source. Additionally or alternatively, the light source may be photographed against a monotone (e.g., black) background, such that representations of lens flare and/or the light source are separable from the background (e.g., based on the representations of lens flare having a color other than black).

During capture of experimental lens flare images 414, the light source may be fixed, while the camera may be disposed on a rotational and/or translational stage that allows the pose thereof relative to the light source to be controlled and/or modified (or vice versa). In one example, a respective experimental lens flare image may be captured every one degree along an equidistant angular sweep of the camera device from negative fifty degrees to positive fifty degrees along a particular direction. In another example, a respective experimental lens flare image may be captured at each of a plurality of linear positions along linear sweep of the camera device along a particular direction. Additionally, in some cases, experimental lens flare images captured at adjacent poses may be interpolated to generate additional images representing lens flare that would likely have been observed in between the adjacent poses. For example, two adjacent experimental images may be used to generate, for example, 1, 2, 4, 8, or another number of interpolated experimental images.

Capturing images of the light source from different relative positions may allow for generation of a plurality of different representations of lens flare caused by internal reflections, since the visual pattern of the representation of lens flare depends on the incidence angle of the light. Similarly, capturing images of the light source using a plurality of different camera devices may further increase the variety of different representations of lens flare caused by internal reflections, since the visual pattern of the representation of lens flare depends on the optical properties of the optical components of each camera device.

Training images 420 may include training image 422 through training image 424 (i.e., training images 422-424). Each of training images 420 may be formed by combining a corresponding baseline image of baseline images 400 with a corresponding lens flare image of lens flare images 406. For example, training image 422 may be formed by combining baseline image 402 with lens flare image 410, while training image 424 may be formed by combining baseline image 404 with lens flare image 418. In some cases, a particular baseline image of baseline images 400 may be combined with multiple different lens flare images of lens flare images 406, thus forming multiple different training images of training images 420. Similarly, a particular lens flare image of lens flare images 406 may be combined with multiple different baseline images of baseline images 400, thus forming multiple different training images of training images 420. Accordingly, the number of baseline images 400 may differ from the number of lens flare images 406. In some cases, training images 420 may be generated based on simulated lens flare images 408, and not based on experimental lens flare images 414, or vice versa.

Each training image of training images 420 may be represented using the variable IF, and may be computed according to the function $I_F=I_0+F+N$, where N represented added noise. Thus, in one example, a particular baseline image may be combined with a corresponding lens flare image by adding a plurality of pixel values of the particular baseline image to corresponding pixel values of the corresponding lens flare image. Specifically, values of pixels that represent lens flare (rather than the monotone background) in the corresponding lens flare image may be added to values of spatially-corresponding pixels in the particular baseline image. In some cases, noise may be added to each resulting pixel value to generate a corresponding training pixel of a training image. For example, Gaussian noise may be selected from a normal distribution $N(0, \sigma^2)$ having a zero mean and a o standard deviation (e.g., $\sigma=0.01$). Noise may be added in other ways as well, such as by randomly sampling other types of distributions.

In another example, the training pixel value may be based on a weighted sum of the baseline pixel value and the corresponding lens flare pixel value. In a further example, a particular baseline image may be combined with a corresponding lens flare image by replacing, in the particular baseline image, a plurality of pixel values with corresponding pixel values from the corresponding lens flare image. Specifically, pixel values of pixels that represent lens flare (rather than the monotone background) in the corresponding lens flare image, may replace spatially-corresponding pixels in the particular baseline image. Thus, pixel values associated with pixels of the particular baseline image that initially did not represent lens flare may be replaced with new values, obtained from the corresponding lens flare image, so that the resulting training image represents the scene of the baseline image with the representation of lens flare added thereto.

A corresponding modified image 430 may be generated for each of one or more respective training images of training images 420 by processing the one or more respective training images by machine learning model 304. Modified image 430 may be used to generate, and/or may be generated based on, recovered lens flare image 432. Recovered lens flare image 432 may include the representation of lens flare removed from the corresponding training image as a result of processing by machine learning model 304. Modified image 430 may be represented as $I_M$, and recovered lens flare image 432 may be represented as $I_R$.

In some implementations, machine learning model 304 may be trained to generate modified image 430 (as shown in FIG. 4), and recovered lens flare image 432 may be determined via subtraction of modified image 430 from a corresponding training image. Thus, machine learning model 304 may be represented by the function $f(I_F, \theta)$, where $\theta$ represents a plurality of parameter values (adjustable during training) of machine learning model 304, $f(I_F, \theta)=I_M$, and $I_R=I_F-I_M$. In other implementations, machine learning model 304 may instead be trained to generate recovered lens flare image 432 (not shown), and modified image 430 may be determined via subtraction of recovered lens flare image 432 from a corresponding training image. Thus, machine learning model 304 may be represented by the function $f(I_F, \alpha)$, where $\alpha$ represents a plurality of parameter values (adjustable during training) of machine learning model 304, $f(I_F, \alpha)=I_R$ and $I_M=I_F-I_R$.

Once training of machine learning model 304 is completed, modified image 430 may be a de-flared image that includes little to substantially none of the representation of lens flare found in the corresponding training image. While machine learning model 304 is being trained, modified image 430 may represent an attempt at removal of the representation of lens flare from the corresponding training image, and may be used to adjust one or more parameters of machine learning model 304 to improve the accuracy with which the representation is removed.

Specifically, loss function 434 may be configured to compare modified image 430 to a respective baseline image used to form the corresponding training image on which modified image 430 is based. For example, when modified image 430 is generated based on processing of training image 422 by machine learning model 304, loss function 434 may be configured to compare modified image 430 to baseline image 402 to quantify how accurately baseline image 402 has been reconstructed. In one example, loss function 434 may represent an L1 loss between modified image 430 and the respective baseline image (e.g., baseline image 402 in the example above), and may be represented by the function $L_I(\theta)=\|I_M-I_0\|_1$. In cases where the machine learning model 304 is not configured to in-paint saturated pixels and/or saturated pixel regions, such saturated pixels and/or saturated pixel regions may be omitted by loss function 434.

Additionally or alternatively, loss function 436 may be configured to compare recovered lens flare image 432 to a respective lens flare image used to form the corresponding training image on which recovered lens flare image 432 is based. For example, when modified image 430 and recovered lens flare image 432 are generated based on processing of training image 422 by machine learning model 304, loss function 436 may be configured to compare recovered lens flare image 432 to lens flare image 410 to quantify how accurately lens flare image 410 has been removed. In one example, loss function 436 may represent an L1 loss between recovered lens flare image 432 and the respective lens flare image (e.g., lens flare image 410 in the example above), and may be represented by $L_F(\theta)=\|I_R-F\|_1$. Using loss function 436 in addition to loss function 434 may improve the accuracy with which trained machine learning model 304 removes representations of lens flare from images.

In some cases, one or more additional loss functions (not shown) may be used in training of machine learning model 304. For example, a third loss function may be configured to compare results of processing of each of (i) modified image 430 and (ii) the respective baseline image by a pre-trained image processing model (e.g., a pre-trained convolutional neural network). For example, when modified image 430 is generated based on processing of training image 422 by machine learning model 304, the third loss function may be configured to compare a result $\Phi_l(I_M)$ of processing modified image 430 by the pre-trained image processing model to a result $\Phi_l(I_0)$ of processing of baseline image 402 by the pre-trained image processing model.

In some cases, the result $\Phi_l(I_M)$ and the result $\Phi_l(I_0)$ may represent a particular feature layer (denoted by the "l" subscript) of the pre-trained image processing model, and may thus be viewed as semantic embeddings of the respective images. Thus, the third loss function may quantify, based on the respective semantic embeddings of modified image 430 and baseline image 402, how accurately machine learning model 304 reconstructs baseline image 402. In one example, the third loss function may represent an L1 loss, computed across 1 feature layers, between the embedding of modified image 430 and the embedding of the respective baseline image (e.g., baseline image 402 in the example above), and may be represented by $L_p(\theta)=\Sigma_l \lambda_l \|\Phi_l(I_M)-\Phi_l(I_0)\|_1$, where $\lambda_l$ is a feature layer-specific weight.

Parameter adjuster 438 may be configured to adjust one or more parameters of machine learning model 304 based on loss functions 434 and the output thereof, loss function 436 and the outputs thereof, and/or the one or more additional loss functions and the outputs thereof. For example, parameter adjuster 438 may be configured to compute an overall loss function based on a weighted sum of loss functions 434 and 436 and the one or more additional loss functions. The overall loss function may thus be expressed as $L(\theta)=w_1L_1(\theta)+w_2L_p(\theta)+w_3L_F(\theta)$. Parameter adjuster 438 may be configured to determine a gradient of the overall loss function at a point corresponding to the loss value generated thereby. Based on the gradients, parameter adjuster 438 may be configured to select one or more new values for one or more parameters of machine learning model 304. Parameter adjuster 438 may be configured to train machine learning model 304 using, for example, stochastic gradient descent, batch gradient descent, and/or mini-batch gradient descent. Training iterations may be executed until machine learning model 304 reaches at least a threshold level of accuracy as measured by the overall cost function.

V. EXAMPLE IMAGE RESAMPLING

Figure 5:
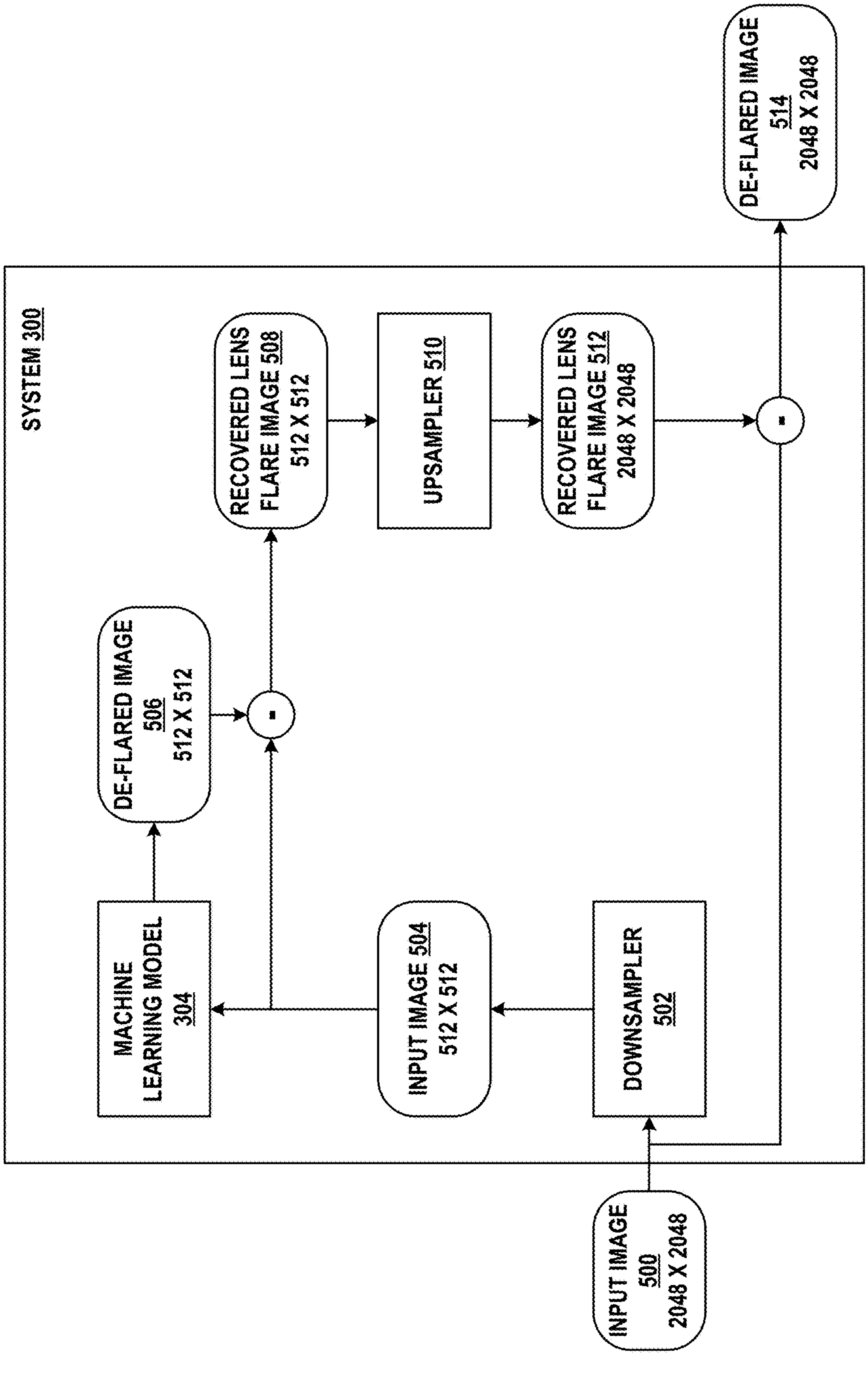
FIG. 5 illustrates a system, in accordance with examples described herein.

FIG. 5 illustrates aspects of system 300 applied to input images of varying resolution. Specifically, machine learning model 304 may be configured to accept as input and generate as output image data having a particular resolution. For example, as illustrated in FIG. 5, the particular resolution may be 512 pixels by 512 pixels (i.e., 512×512). Thus, in order to operate on image data having a different size, system 300 may include downsampler 502 and upsampler 510. For example, input image 500 having a (first) resolution of 2048 pixels by 2048 pixels (i.e., 2048×2048) may be downsampled by a factor of four by downsampler 502 to generate input image 504 having a (second) resolution of 512 pixels by 512 pixels.

Machine learning model 304 may be configured to process input image 504 to generate de-flared image 506 having a resolution of 512 pixels by 512 pixels. System 300 may be configured to generate recovered lens flare image 508 having a resolution of 512 by 512 pixels based on a difference between de-flared image 506 and input image 504. In an alternative implementation, machine learning model 304 may instead be configured to process input image 504 to generate recovered lens flare image 508, and system 300 may be configured to generate de-flared image 506 based on a difference between recovered lens flare image 508 and input image 504 (or generation of de-flared image 506 may be omitted).

Upsampler 510 may be configured to upsample recovered lens flare image 508 by a factor of four to generate recovered lens flare image 512 having a resolution of 2048 pixels by 2048 pixels. System 300 may be configured to generate de-flared image 514 having a resolution of 2048 by 2048 pixels based on a difference between recovered lens flare image 512 and input image 500.

Thus, machine learning model 304 may be applied at the second, smaller resolution of 512 pixels by 512 pixels, while the input and output of system 300 is provided at the first, higher resolution of 2048 by 2048 pixels. In other cases, other resolutions may be used. For example, an instance of machine learning model 304 specific to a particular camera model may be trained to accept and generate images of a specific resolution, which may correspond to an N-fold (e.g., two-fold, four-fold, eight-fold, etc.) downsampling of full-resolution image data that the specific camera model is configured to generate. The camera-specific instance of machine learning model 304 may account for an aspect ratio of the corresponding full-resolution image data, and the aspect ratio of the inputs thereto and outputs thereof may be different than one-to-one.

Further, mask generator 314 may be configured to generate light source mask 316 at the second resolution used by machine learning model (e.g., 512×512), and/or at the first resolution of the input and output image data (e.g., 2048×2048). Thus, in a first example, light source mask 316 having the first resolution (2048×2048) may be applied to input image 500 and de-flared image 514. Alternatively, in a second example, light source mask 316 having the second resolution (512×512) may be applied to input image 504 and de-flared image 506, followed by subsequent upsampling to the second resolution (2048×2048).

VI. ADDITIONAL EXAMPLE OPERATIONS

Figure 6:
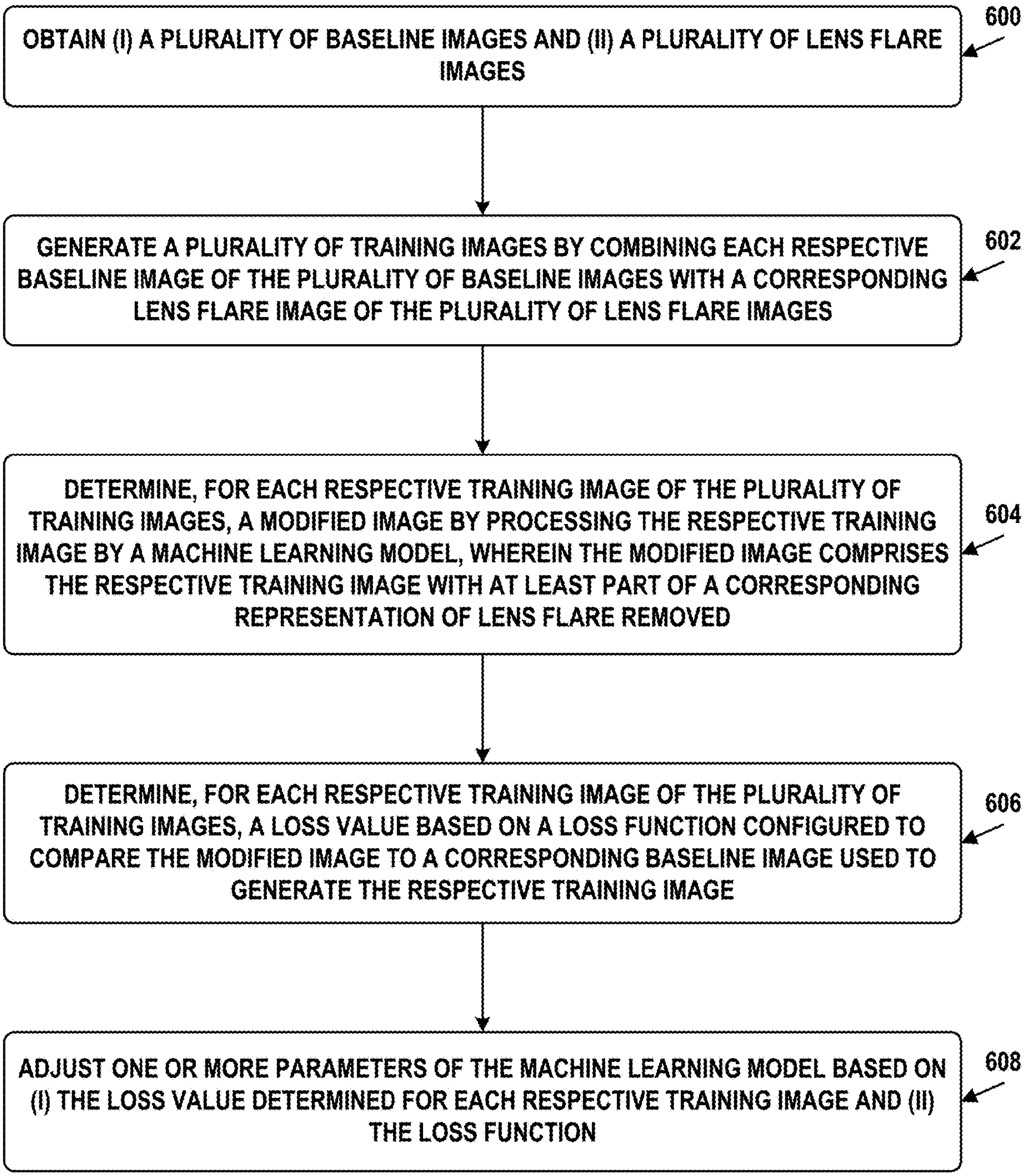
FIG. 6 illustrates a flow chart, in accordance with examples described herein.
Figure 7:
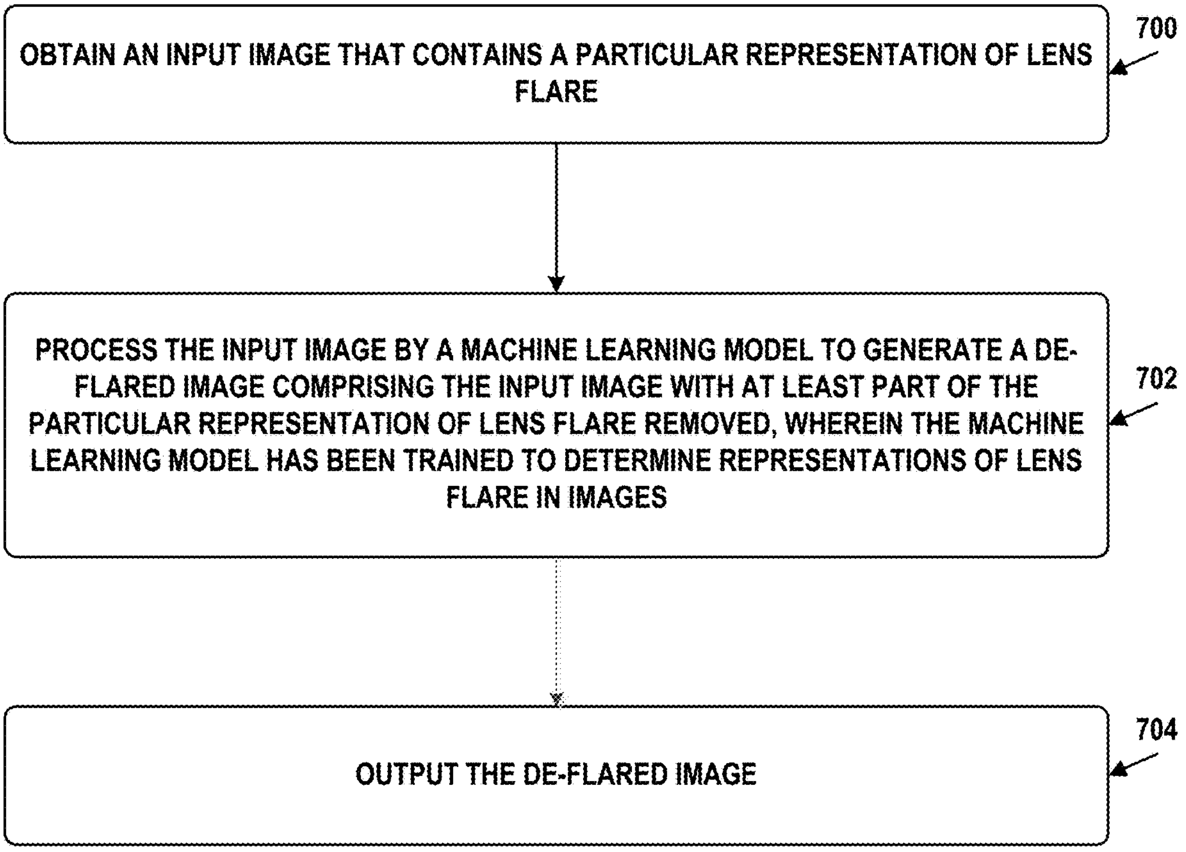
FIG. 7 illustrates a flow chart, in accordance with examples described herein.

FIG. 6 illustrates a flow chart of operations related to training a machine learning model to process images containing representations of lens flare. FIG. 7 illustrates a flow chart of operations related to processing of images using a machine learning model in order to remove representations of lens flare from the images. The operations of FIGS. 6 and/or 7 may be carried out by computing device 100, computing system 200, system 300, and/or other types of computing devices. The operations of FIGS. 6 and/or 7 may be carried out by a computing device equipped with one or more camera devices, and/or by a computing device lacking any camera devices. The embodiments of FIGS. 6 and/or 7 may be simplified by the removal of any one or more of the features shown therein. Further, these embodiments may be combined with features, aspects, and/or implementations of any of the previous figures or otherwise described herein.

Turning to FIG. 6, block 600 may involve obtaining (i) a plurality of baseline images and (ii) a plurality of lens flare images.

Block 602 may involve generating a plurality of training images by combining each respective baseline image of the plurality of baseline images with a corresponding lens flare image of the plurality of lens flare images. For example, values of one or more pixels in the respective baseline image may be added to or replaced with values of one or more pixels representing lens flare (rather than background) in the corresponding lens flare image.

Block 604 may involve determining, for each respective training image of the plurality of training images, a modified image by processing the respective training image by a machine learning model. The modified image may include the respective training image with at least part of a corresponding representation of lens flare removed. Over the course of training of the machine learning model, the extent to which and/or the accuracy with which the machine learning model determines the corresponding representation of lens flare in the training images may improve. Thus, the extent to which and/or the accuracy with which the corresponding representation of lens flare is removed from the respective training image may also improve.

Block 606 may involve determining, for each respective training image of the plurality of training images, a loss value based on a loss function configured to compare the modified image to a corresponding baseline image used to generate the respective training image.

Block 608 may involve adjusting one or more parameters of the machine learning model based on (i) the loss value determined for each respective training image and (ii) the loss function. For example, the one or more parameters may be adjusted based on a value of a gradient of the loss function at or near the loss value.

In some embodiments, the plurality of lens flare images may include one or more simulated lens flare images generated by computationally simulating an optical system of a camera device to generate representations of one or more first lens flare patterns. For example, the optical components of the camera device, such as lenses and the image sensor, may be simulated along with a light source used to emit the light that the camera device is configured to capture.

In some embodiments, at least a portion of the representations of the one or more first lens flare patterns may represent scattering of light by one or more defects present on a lens of the camera device. For example, the defects may include dust present on the lens and/or scratches or other physical imperfections present on the lens. Capturing experimental data that includes a wide range of defects may be difficult, time-consuming, and/or impractical, since it may be difficult to accurately control the physical defects present on physical components of the camera device. Simulation, however, may allow the sizing, positioning, and/or other attributes of the defects to be controlled more easily, and may thus facilitate the collection of lens flare images representative of a wide range of different representations of lens flare.

In some embodiments, computationally simulating the optical system of the camera device may include determining an aperture function of the camera device. The aperture function may represent one or more defects present on a lens of the camera device. For example, each point along a simulated aperture of a simulated version of the camera device may be associated with a corresponding transparency to light, with defects having different transparencies than non-defective portions of the aperture. A linear phase shift may be determined based on an angular position of the camera device relative to a simulated light source. An extent of defocus may be determined based on a depth of the camera device relative to the simulated light source. A point spread function of the camera device may be determined based on a Fourier transform of a product of (i) the aperture function and (ii) an exponential function of a sum of the linear phase shift and the extent of defocus. The computational simulation may thus be used to model the physical response of one or more camera devices (having corresponding defects) to various simulated light sources.

In some embodiments, computationally simulating the optical system of the camera device may further include generating a multi-channel point spread function representing an incoherent light source by sampling the point spread function at a plurality of different wavelengths. For example, the point spread function may be sampled from 380 nanometers to 740 nanometers in increments of 5 nanometers, resulting in a 73-channel point spread function. A particular simulated lens flare image of the one or more simulated lens flare images may be generated by multiplying the multi-channel point spread function by a color matrix configured to transform the multi-channel point spread function into image space. Thus, an image formed on an image plane of the simulated camera device may be transformed into pixel values (e.g., red-green-blue pixel values) that collectively define a corresponding image containing a respective representation of lens flare caused by corresponding defects represented by the aperture function.

In some embodiments, additional simulated lens flare images of the one or more simulated lens flare images may be generated by adjusting one or more of: (i) the aperture function, (ii) a position of the camera device relative to the simulated light source, or (iii) the color matrix. Thus, the simulated lens flare images may be representative of a wide range of possible physical conditions leading to a wide range of different representations of lens flare.

In some embodiments, the plurality of lens flare images may include one or more experimental lens flare images captured using a physical camera device. The one or more experimental lens flare images may contain representations of one or more second lens flare patterns caused by one or more light sources emitting light toward the camera device. The one or more experimental lens flare images may be captured with the camera device disposed at one or more different poses relative to the one or more light sources.

In some embodiments, the one or more experimental lens flare images may include a plurality of experimental lens flare images captured with the camera device disposed at a plurality of different poses relative to the one or more light sources. Thus, the experimental lens flare images may represent lens flare as captured by an actual camera device under real-world conditions. Variations in camera position and/or orientation relative to the light source may generate a variety of different representations of lens flare, thereby contributing diversity to the training images.

In some embodiments, the camera device may include a plurality of different camera devices. Each camera device of the plurality of different camera devices may differ from other camera devices of the plurality of different camera devices by at least one imaging/optical parameter. Thus, the experimental lens flare images may include representations of lens flare resulting from a variety of possible camera designs/implementations, and may thus allow the machine learning model to learn to extrapolate to representations of lens flare captured by camera devices with respect to which the machine learning model has not been specifically trained.

In some embodiments, at least a portion of the representations of the one or more second lens flare patterns may represent reflection of light from one or more surfaces of a lens of the camera device. Lens flare resulting from reflection of light by the lens may be difficult to simulate due to difficulty in obtaining/determining an accurate model of the lens used by the camera device, which might not be made publicly available/accessible by the lens designer and/or manufacturer. Further, representations of lens flare resulting from reflections captured by a particular camera may be similar across similar camera devices and/or lens models. Thus, the experimental lens flare images captured using the particular camera may be representative of lens flare associated with similar camera devices. Using two or more different camera models to capture the lens flare images may further improve the informational diversity of the training images.

In some embodiments, a recovered lens flare image may be determined for each respective training image of the plurality of training images (i) by the machine learning model or (ii) based on a difference between the modified image and the respective training image. For example, the recovered lens flare image may include the representation of lens flare contained in the respective training image, and may represent little to no other aspects of the scene represented by the respective training image. In some cases, a trained machine learning model may be configured to produce a modified image that substantially does not contain any representations of lens flare, resulting in a recovered lens flare image that includes substantially only the representation of lens flare, without substantially representing any other portions of the scene. In other cases, a trained machine learning model may be configured to produce a recovered lens flare image that contains substantially only representations of lens flare, without substantially representing any other portions of the scene. The loss value may be determined for each respective training image further based on a second loss function configured to compare the recovered lens flare image to a corresponding lens flare image used to generate the respective training image.

Accordingly, the loss value may represent the accuracy with which the machine learning model determines/identifies the representations of lens flare in the training images, as well as how accurately these representations of lens flare match up with the original representations of lens flare used to generate the training images. Using the second loss function may allow for increased accuracy in the trained machine learning model, by providing an additional metric of quality of output of the machine learning model relative to ground-truth data.

In some embodiments, determining the loss value may include determining a sum of (i) a product of a first weighing value and an output of the loss function and (ii) a product of a second weighing value and an output of the second loss function. For example, each of the first weighing value and the second weighing value may be equal (e.g., each may be equal to 0.5), resulting in each of the loss function and the second loss function contributing equally to the computation of the loss value. Other weighing values are possible, and may be used to improve various aspects of the machine learning model, such as accuracy and/or training rate, among others.

In some embodiments, the machine learning model may include a convolutional neural network. For example, the machine learning model may be arranged according to the U-Net architecture, or the VGG-19 architecture, among other possible architectures.

In some embodiments, the plurality of baseline images may include a plurality of monoscopic images. Thus, the machine learning model may be trained to determine representations of lens flare without relying on cues and/or information present in, for example, stereoscopic images and/or multiple sequentially-captured images, among other possibilities.

In some embodiments, at least a subset of the plurality of baseline images may include flare-free images that do not contain representations of lens flare. Thus, when such a baseline image is combined with a lens flare image, the representation of lens flare in the resulting image may be accurately known, since the lens flare image is the source of this representation of lens flare and the baseline image does not otherwise contain other representations of lens flare. The baseline images may represent a wide variety of different scenes/environments so that the machine learning model may be trained to generalize to a wide range of possible inputs.

In some embodiments, the plurality of lens flare images may contain respective representations of lens flare shown against a monotone background. The monotone background may be chosen to allow the representation of lens flare to be easily separated from the background. Thus, for example, the monotone background may be black to allow for a high level of contrast with the representations of lens flare. Further, the plurality of lens flare images may be captured in an optically-isolated environment, such that substantially only the light source being photographed is causing lens flare. When a lens flare image is combined with a corresponding baseline image, the representation of lens flare may be added to the baseline image, and the monotone background may be discarded.

In some embodiments, an input image that contains a particular representation of lens flare may be obtained. After adjusting the one or more parameters of the machine learning model, a de-flared image may be generated based on processing of the input image by the machine learning model. The de-flared image may be outputted (e.g., stored and/or displayed). The de-flared image may include the input image with at least part of the particular representation of lens flare removed. In some cases (e.g., when the machine learning model is well-trained), processing by the machine learning model may result in removal of substantially all of the particular representation of lens flare.

In some embodiments, a particular recovered lens flare image may be determined (i) by the machine learning model or (ii) based on a difference between the de-flared image (which may be generated by the machine learning model) and the input image. The particular recovered lens flare image may constitute the part of the particular representation of lens flare that has been removed from the input image. A first modified version of the input image may be generated by adjusting a visual appearance of the particular representation of lens flare in the input image based on the particular recovered lens flare image. The first modified version of the input image may be outputted (e.g., stored and/or displayed).

In some embodiments, adjusting the visual appearance of the particular representation of lens flare in the input image may include one or more of: (i) increasing an intensity of the visual appearance, (ii) decreasing an intensity of the visual appearance, or (iii) adjusting a color of the visual appearance. Thus, the particular recovered lens flare image may be used to apply various visual effects to the particular representation of lens flare in the input image.

In some embodiments, a down-sampled version of the input image may be generated by downsampling the input image from a first resolution to a second resolution. The de-flared image may be generated based on the down-sampled version of the input image. The de-flared image may have the second resolution. The particular recovered lens flare image may be determined (i) by the machine learning model or (ii) by subtracting the de-flared image from the down-sampled version of the input image. The particular recovered lens flare image may have the second resolution. An up-sampled version of the particular recovered lens flare image may be generated by upsampling the particular recovered lens flare image from the second resolution to the first resolution. The first modified version of the input image may be generated by adjusting the visual appearance of the particular representation of lens flare in the input image based on the up-sampled version of the particular recovered lens flare image. Accordingly, computationally-intensive operations may be carried out at the second resolution, while the resulting visual effects may be applied at the first resolution, thereby allowing the benefits to be realized while reducing computational cost.

In some embodiments, a light source mask may be determined based on the input image. The light source mask may be configured to mask out one or more light sources that are (i) represented in the input image and (ii) causing the particular representation of lens flare. A second modified version of the input image may be generated by combining (i) a first product of a pixel-wise multiplication between the input image and the light source mask with (ii) a second product of a pixel-wise multiplication between the de-flared image and an inverse of the light source mask. The second modified version of the input image may be outputted (e.g., stored and/or displayed).

In some cases, the machine learning model may be configured to determine/identify representations of light sources along with the representations of lens flare, resulting in removal of the representation of the light sources. Thus, the light source mask may be used to reintroduce the representations of the light sources back into the de-flared image, resulting in more realistic images.

In some embodiments, the light source mask may include a plurality of pixels and may have a same resolution as the input image. Determining the light source mask may include identifying, within the input image, one or more pixels associated with respective luminance values that exceed a threshold luminance, and determining the light source mask by assigning (i) a first value to one or more pixels of the plurality of pixels that spatially correspond to respective positions of the one or more pixels and (ii) a second value to one or more other pixels of the plurality of pixels. For example, pixels corresponding to a light source may each be set to a value of 1 or 255, while other pixels that do not correspond to a light source may each be set to a value of zero.

Turning to FIG. 7, block 700 may involve obtaining an input image that contains a particular representation of lens flare.

Block 702 may involve processing the input image by a machine learning model to generate a de-flared image that includes the input image with at least part of the particular representation of lens flare removed. The machine learning model may have been trained to determine/identify representations of lens flare in images.

Block 704 may involve outputting the de-flared image.

In some embodiments a particular recovered lens flare image may be determined (i) by the machine learning model or (ii) based on a difference between the de-flared image and the input image. A first modified version of the input image may be generated by adjusting a visual appearance of the particular representation of lens flare in the input image based on the particular recovered lens flare image. The first modified version of the input image may be outputted (e.g., stored and/or displayed).

In some embodiments, adjusting the visual appearance of the particular representation of lens flare in the input image may include one or more of: (i) increasing an intensity of the visual appearance, (ii) decreasing an intensity of the visual appearance, or (iii) adjusting a color of the visual appearance.

In some embodiments, a down-sampled version of the input image may be generated by downsampling the input image from a first resolution to a second resolution. The de-flared image may be generated based on the down-sampled version of the input image. The de-flared image may have the second resolution. The particular recovered lens flare image may be determined (i) by the machine learning model or (ii) by subtracting the de-flared image from the down-sampled version of the input image. The particular recovered lens flare image may have the second resolution. An up-sampled version of the particular recovered lens flare image may be generated by upsampling the particular recovered lens flare image from the second resolution to the first resolution. The first modified version of the input image may be generated by adjusting the visual appearance of the particular representation of lens flare in the input image based on the up-sampled version of the particular recovered lens flare image.

In some embodiments, a light source mask may be determined based on the input image. The light source mask may be configured to mask out one or more light sources that are (i) represented in the input image and (ii) causing the particular representation of lens flare. A second modified version of the input image may be generated by combining (i) a first product of a pixel-wise multiplication between the input image and the light source mask with (ii) a second product of a pixel-wise multiplication between the de-flared image and an inverse of the light source mask. The second modified version of the input image may be outputted (e.g., stored and/or displayed).

In some embodiments, the light source mask may include a plurality of pixels and may have a same resolution as the input image. Determining the light source mask may include identifying, within the input image, one or more pixels associated with respective luminance values that exceed a threshold luminance, and determining the light source mask by assigning (i) a first value to one or more pixels of the plurality of pixels that spatially correspond to respective positions of the one or more pixels and (ii) a second value to one or more other pixels of the plurality of pixels.

In some embodiments, the machine learning model may be trained based on a plurality of training images generated by combining each respective baseline image of a plurality of baseline images with a corresponding lens flare image of a plurality of lens flare images.

In some embodiments, the machine learning model may have been trained to determine/identify representations of lens flare in images by obtaining (i) a plurality of baseline images and (ii) a plurality of lens flare images. A plurality of training images may be generated by combining each respective baseline image of the plurality of baseline images with a corresponding lens flare image of a plurality of lens flare images. A modified image may be determined for each respective training image of the plurality of training images by processing the respective training image by the machine learning model. The modified image may include the respective training image with at least part of a corresponding representation of lens flare removed. A loss value may be determined for each respective training image of the plurality of training images based on a loss function configured to compare the modified image to a corresponding baseline image used to generate the respective training image. One or more parameters of the machine learning model may be adjusted based on (i) the loss value determined for each respective training image and (ii) the loss function.

In some embodiments, a recovered lens flare image may be determined for each respective training image of the plurality of training images (i) by the machine learning model or (ii) based on a difference between the modified image and the respective training image. The loss value may be determined for each respective training image of the plurality of training images further based on a second loss function configured to compare the recovered lens flare image to a corresponding lens flare image used to generate the respective training image. The one or more parameters may be adjusted further based on the second loss function.

In some embodiments, determining the loss value may include determining a sum of (i) a product of a first weighing value and an output of the loss function and (ii) a product of a second weighing value and an output of the second loss function.

In some embodiments, the plurality of lens flare images may include one or more simulated lens flare images generated by computationally simulating an optical system of a camera device to generate representations of one or more first lens flare patterns.

In some embodiments, at least a portion of the representations of the one or more first lens flare patterns may represent scattering of light by one or more defects present on a lens of the camera device.

In some embodiments, computationally simulating the optical system of the camera device may include determining an aperture function of the camera device. The aperture function may represent one or more defects present on a lens of the camera device. A linear phase shift may be determined based on an angular position of the camera device relative to a simulated light source. An extent of defocus may be determined based on a depth of the camera device relative to the simulated light source. A point spread function of the camera device may be determined based on a Fourier transform of a product of (i) the aperture function and (ii) an exponential function of a sum of the linear phase shift and the extent of defocus. A multi-channel point spread function representing an incoherent light source may be generated by sampling the point spread function at a plurality of different wavelengths. A particular simulated lens flare image of the one or more simulated lens flare images may be generated by multiplying the multi-channel point spread function by a color matrix configured to transform the multi-channel point spread function into image space. Additional simulated lens flare images of the one or more simulated lens flare images may be generated by adjusting one or more of: (i) the aperture function, (ii) a position of the camera device relative to the simulated light source, or (iii) the color matrix.

In some embodiments, the plurality of lens flare images may include one or more experimental lens flare images captured using a camera device. The one or more experimental lens flare images may contain representations of one or more second lens flare patterns caused by one or more light sources emitting light toward the camera device. The one or more experimental lens flare images may be captured with the camera device disposed at one or more different poses relative to the one or more light sources.

In some embodiments, the one or more experimental lens flare images may include a plurality of experimental lens flare images captured with the camera device disposed at a plurality of different poses relative to the one or more light sources.

In some embodiments, at least a portion of the representations of the one or more second lens flare patterns may represent reflection of light from one or more surfaces of a lens of the camera device.

In some embodiments, the machine learning model may include a convolutional neural network.

In some embodiments, the plurality of baseline images may include a plurality of monoscopic images.

In some embodiments, at least a subset of the plurality of baseline images may include flare-free images that do not contain representations of lens flare.

In some embodiments, the plurality of lens flare images may contain respective representations of lens flare shown against a monotone background.

In some embodiments, outputting the de-flared image may include storing the de-flared image and/or displaying the de-flared image.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining an input image that contains a visual representation of lens flare;

generating, based on processing the input image by a machine learning model, (i) a de-flared image comprising the input image with at least part of the visual representation of lens flare removed and (ii) a recovered lens flare image, wherein:

the de-flared image is generated by the machine learning model and the recovered lens flare image is based on a difference between the de-flared image and the input image; or the recovered lens flare image is generated by the machine learning model, and the de-flared image is based on a difference between the recovered lens flare image and the input image;

generating a modified version of the input image by adjusting the visual representation of lens flare in the input image based on the recovered lens flare image, wherein the modified version of the input image comprises an adjusted visual representation of lens flare that differs from the visual representation of lens flare in the input image; and outputting the modified version of the input image.

2. The computer-implemented method of claim 1, wherein adjusting the visual representation of lens flare in the input image comprises:

determining one or more flare modification values;

determining modified flare pixel values by applying the one or more flare modification values to pixels of the recovered lens flare image that correspond to the visual representation of lens flare; and combining the modified flare pixel values with corresponding pixel values of the de-flared image.

3. The computer-implemented method of claim 1, wherein adjusting the visual representation of lens flare in the input image comprises adjusting an intensity of the visual representation.

4. The computer-implemented method of claim 1, wherein adjusting the visual representation of lens flare in the input image comprises adjusting a color of the visual representation.

5. The computer-implemented method of claim 1, further comprising:

determining, based on the input image, a light source mask corresponding to a light source that is represented in the input image and causes the visual representation of lens flare, wherein the modified version of the input image is generated further based on the light source mask.

6. The computer-implemented method of claim 5, wherein generating the modified version of the input image comprises:

determining a first masked image based on a pixel-wise multiplication between the input image and the light source mask;

determining a second masked image based on a pixel-wise multiplication between the de-flared image and an inverse of the light source mask; and generating the modified version of the input image based on the first masked image and the second masked image.

7. The computer-implemented method of claim 5, wherein the light source mask comprises a plurality of mask pixels and has a same resolution as the input image, and wherein determining the light source mask comprises:

identifying, within the input image, one or more pixels associated with respective luminance values that exceed a threshold luminance; and determining the light source mask by assigning (i) a first value to one or more mask pixels of the plurality of mask pixels that spatially correspond to respective positions of the one or more pixels and (ii) a second value to one or more other mask pixels of the plurality of mask pixels.

8. The computer-implemented method of claim 1, further comprising:

generating a down-sampled version of the input image by downsampling the input image from a first resolution to a second resolution, wherein the de-flared image is generated based on the down-sampled version of the input image, wherein the de-flared image has the second resolution, wherein the recovered lens flare image is (i) generated by the machine learning model or (ii) based on a difference between the de-flared image and the down-sampled version of the input image, and wherein the recovered lens flare image has the second resolution; and generating an up-sampled version of the recovered lens flare image by upsampling the recovered lens flare image from the second resolution to the first resolution, wherein the modified version of the input image is generated by adjusting the visual representation of lens flare in the input image based on the up-sampled version of the recovered lens flare image.

9. The computer-implemented method of claim 1, wherein the machine learning model comprises a convolutional neural network.

10. The computer-implemented method of claim 1, wherein the machine learning model has been trained by a training process comprising:

obtaining (i) a plurality of baseline images and (ii) a plurality of lens flare images;

generating a plurality of training images by combining each respective baseline image of the plurality of baseline images with a corresponding lens flare image of a plurality of lens flare images;

determining, for each respective training image of the plurality of training images, a modified training image by processing the respective training image by the machine learning model, wherein the modified training image comprises the respective training image with at least part of a corresponding representation of lens flare removed;

determining a loss value based on a first loss function configured to compare the modified training image to a corresponding baseline image used to generate the respective training image; and adjusting one or more parameters of the machine learning model based on the loss value determined for each respective training image and the first loss function.

11. The computer-implemented method of claim 10, wherein the training process further comprises:

determining, for each respective training image of the plurality of training images, a training recovered lens flare image (i) by the machine learning model or (ii) based on a difference between the modified training image and the respective training image; and determining the loss value further based on a second loss function configured to compare the training recovered lens flare image to a corresponding lens flare image used to generate the respective training image, wherein the one or more parameters are adjusted further based on the second loss function.

12. The computer-implemented method of claim 10, wherein the plurality of lens flare images comprise at least one of:

one or more simulated lens flare images generated by computationally simulating an optical system of a camera device to generate representations of one or more first lens flare patterns, or one or more experimental lens flare images captured using a camera device, wherein the one or more experimental lens flare images contain representations of one or more second lens flare patterns caused by one or more light sources emitting light toward the camera device, and wherein the one or more experimental lens flare images are captured with the camera device disposed at one or more different poses relative to the one or more light sources.

13. The computer-implemented method of claim 12, wherein:

at least a portion of the representations of the one or more first lens flare patterns represents scattering of light by one or more defects present on a lens of the camera device, or at least a portion of the representations of the one or more second lens flare patterns represents reflection of light from one or more surfaces of a lens of the camera device.

14. The computer-implemented method of claim 10, wherein at least a subset of the plurality of baseline images comprises flare-free images that do not contain representations of lens flare.

15. The computer-implemented method of claim 10, wherein the plurality of lens flare images contain respective representations of lens flare shown against a monotone background.

16. A system comprising:

a processor; and a non-transitory computer-readable medium having stored thereon instructions that, when executed by the processor, cause the processor to perform operations comprising:

obtaining an input image that contains a visual representation of lens flare;

generating, based on processing the input image by a machine learning model, (i) a de-flared image comprising the input image with at least part of the visual representation of lens flare removed and (ii) a recovered lens flare image, wherein:

the de-flared image is generated by the machine learning model and the recovered lens flare image is based on a difference between the de-flared image and the input image; or the recovered lens flare image is generated by the machine learning model, and the de-flared image is based on a difference between the recovered lens flare image and the input image;

generating a modified version of the input image by adjusting the visual representation of lens flare in the input image based on the recovered lens flare image, wherein the modified version of the input image comprises an adjusted visual representation of lens flare that differs from the visual representation of lens flare in the input image; and outputting the modified version of the input image.

17. The system of claim 16, wherein adjusting the visual representation of lens flare in the input image comprises:

determining one or more flare modification values;

determining modified flare pixel values by applying the one or more flare modification values to pixels of the recovered lens flare image that correspond to the visual representation of lens flare; and combining the modified flare pixel values with corresponding pixel values of the de-flared image.

18. The system of claim 16, wherein adjusting the visual representation of lens flare in the input image comprises adjusting a color of the visual representation.

19. A non-transitory computer-readable medium having stored thereon instructions that, when executed by a computing device, cause the computing device to perform operations comprising:

obtaining an input image that contains a visual representation of lens flare;

generating, based on processing the input image by a machine learning model, (i) a de-flared image comprising the input image with at least part of the visual representation of lens flare removed and (ii) a recovered lens flare image, wherein:

the de-flared image is generated by the machine learning model and the recovered lens flare image is based on a difference between the de-flared image and the input image; or the recovered lens flare image is generated by the machine learning model, and the de-flared image is based on a difference between the recovered lens flare image and the input image;

generating a modified version of the input image by adjusting the visual representation of lens flare in the input image based on the recovered lens flare image, wherein the modified version of the input image comprises an adjusted visual representation of lens flare that differs from the visual representation of lens flare in the input image; and outputting the modified version of the input image.

20. The non-transitory computer-readable medium of claim 19, wherein adjusting the visual representation of lens flare in the input image comprises:

determining one or more flare modification values;

determining modified flare pixel values by applying the one or more flare modification values to pixels of the recovered lens flare image that correspond to the visual representation of lens flare; and combining the modified flare pixel values with corresponding pixel values of the de-flared image.

* * * * *